United States Patent
Wu et al.

(10) Patent No.: US 11,483,898 B2
(45) Date of Patent: Oct. 25, 2022

(54) SESSION MANAGEMENT METHOD AND SESSION MANAGEMENT NETWORK ELEMENT

(71) Applicant: HUAWEI TECHNOLOGIES CO., LTD., Guangdong (CN)

(72) Inventors: Yizhuang Wu, Beijing (CN); Chunshan Xiong, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 230 days.

(21) Appl. No.: 16/380,444

(22) Filed: Apr. 10, 2019

(65) Prior Publication Data
US 2019/0239281 A1 Aug. 1, 2019

Related U.S. Application Data

(63) Continuation of application No. PCT/CN2016/101834, filed on Oct. 12, 2016.

(51) Int. Cl.
*H04W 76/27* (2018.01)
*H04W 28/02* (2009.01)
(Continued)

(52) U.S. Cl.
CPC ............. *H04W 80/10* (2013.01); *H04W 8/08* (2013.01); *H04W 8/20* (2013.01);
(Continued)

(58) Field of Classification Search
CPC ..... H04W 80/10; H04W 76/25; H04W 76/22; H04W 76/27; H04W 8/08; H04W 8/20;
(Continued)

(56) References Cited

U.S. PATENT DOCUMENTS

| 2012/0057574 | A1* | 3/2012 | Horn ................ H04W 8/04 370/338 |
| 2012/0189016 | A1 | 7/2012 | Bakker et al. |

(Continued)

FOREIGN PATENT DOCUMENTS

| CN | 1870630 A | 11/2006 |
| CN | 101400148 A | 4/2009 |

(Continued)

OTHER PUBLICATIONS

Huawei, HiSilicon, "Update solution 4.23 and interim agreement on session management," [online], 3GPP TSG-SA WG2#117 S2-165646, Oct. 11, 2016, total 6 pages.

(Continued)

*Primary Examiner* — Luat Phung
(74) *Attorney, Agent, or Firm* — Womble Bond Dickinson (US) LLP

(57) ABSTRACT

Embodiments of the present application relate to the wireless communications field, and in particular, to a session management method and a session management network element. The session management method includes: receiving, by a first control plane network element, a user equipment UE context response message from a second control plane network element, where the UE context response message carries a first session message, and the first session message is a pending session message; and sending, by the first control plane network element, a second session message to user equipment according to the UE context response message. According to the session management method and the session management network element in the embodiments of the present application, a session can be managed in a scenario in which a control plane connection of user equipment changes.

19 Claims, 12 Drawing Sheets

(51) Int. Cl.
  *H04W 80/10* (2009.01)
  *H04W 76/22* (2018.01)
  *H04W 8/20* (2009.01)
  *H04W 76/25* (2018.01)
  *H04W 8/08* (2009.01)
  *H04W 64/00* (2009.01)
  *H04W 48/20* (2009.01)

(52) U.S. Cl.
  CPC ..... *H04W 28/0268* (2013.01); *H04W 64/003* (2013.01); *H04W 76/22* (2018.02); *H04W 76/25* (2018.02); *H04W 76/27* (2018.02); *H04W 48/20* (2013.01)

(58) Field of Classification Search
  CPC .......... H04W 28/0268; H04W 64/003; H04W 48/20
  See application file for complete search history.

(56) References Cited

U.S. PATENT DOCUMENTS

| | | |
|---|---|---|
| 2012/0257739 A1 | 10/2012 | David et al. |
| 2012/0282941 A1 | 11/2012 | Lu et al. |
| 2013/0039287 A1* | 2/2013 | Rayavarapu ........ H04W 72/042 370/329 |
| 2013/0077592 A1 | 3/2013 | Wang |
| 2014/0050199 A1 | 2/2014 | Chen et al. |
| 2014/0198718 A1 | 7/2014 | Billau et al. |
| 2014/0200925 A1 | 7/2014 | Hawkins et al. |
| 2017/0374542 A1* | 12/2017 | Ryu ........................ H04W 8/08 |
| 2018/0092154 A1* | 3/2018 | Ai ......................... H04W 76/12 |
| 2018/0338260 A1 | 11/2018 | Hsu et al. |
| 2019/0182873 A1* | 6/2019 | Wass ..................... H04W 76/10 |

FOREIGN PATENT DOCUMENTS

| | | |
|---|---|---|
| CN | 101478743 A | 7/2009 |
| CN | 101572943 A | 11/2009 |
| CN | 101600192 A | 12/2009 |
| CN | 101969634 A | 2/2011 |
| CN | 102217360 A | 10/2011 |
| CN | 102348252 A | 2/2012 |
| CN | 102413561 A | 4/2012 |
| CN | 102523573 A | 6/2012 |
| CN | 102624584 A | 8/2012 |
| CN | 102740270 A | 10/2012 |
| CN | 102932769 A | 2/2013 |
| CN | 105393626 A | 3/2016 |
| EP | 2515560 A1 | 10/2012 |
| JP | 2014506747 A | 3/2014 |
| WO | 2016114611 A1 | 7/2016 |

OTHER PUBLICATIONS

Huawei, HiSilicon, "SM and MM decoupling," [online], 3GPP TSG-SA WG2#117 S2-165642,Oct. 11, 2016,total 5 pages.
PCT International Search Report for PCT Application No. PCT/CN2016/101834 with English translation, 4 pgs. (Jun. 28, 2017).

* cited by examiner

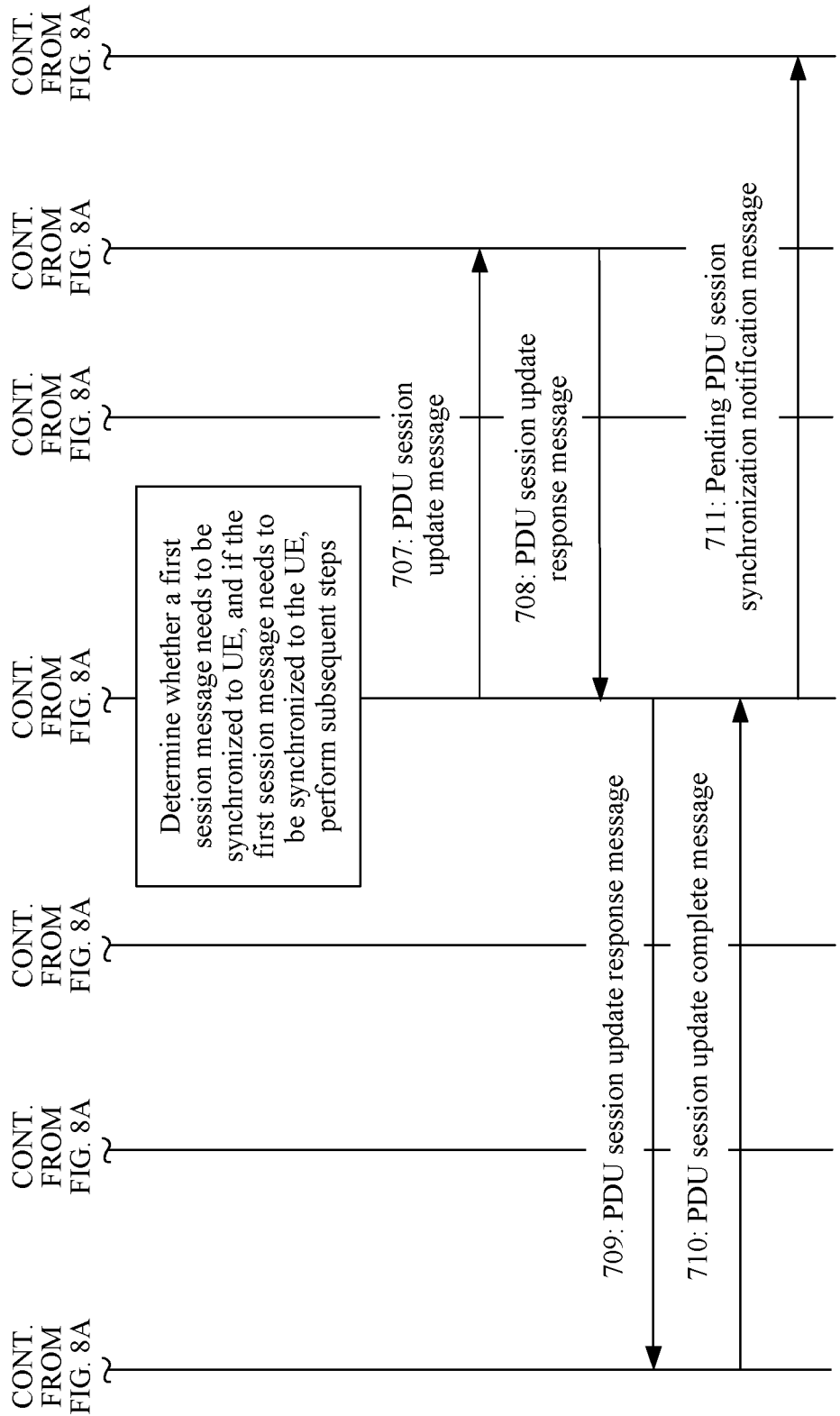

SESSION MANAGEMENT METHOD AND SESSION MANAGEMENT NETWORK ELEMENT

CROSS-REFERENCE TO RELATED APPLICATIONS

This application is a continuation of International Application No. PCT/CN2016/101834, filed on Oct. 12, 2016, the disclosure of which is hereby incorporated by reference in its entirety.

TECHNICAL FIELD

Embodiments of the present application relate to the wireless communications field, and in particular, to a session management method and a session management network element.

BACKGROUND

During session management of an evolved packet system (EPS), a context of a session needs to be synchronized between user equipment (UE) and a network side. To be specific, a bearer context of the session needs to be synchronized. Setup, modification, and deletion of the bearer context may be initiated by the user equipment or the network side. Currently, when the network side initiates a setup, modification, and deletion procedure of the bearer context, the network side needs to immediately notify the user equipment of information (about deleting a bearer, modifying a bearer, or setting up a bearer) about the session, so that the session information is synchronized between the UE side and the network side. When the network side initiates the foregoing procedure, if the UE is in an idle state, the network initiates a paging procedure so that the UE enters a connected state, and synchronizes modified session information to the UE. For minimizing overheads of air interface signaling to a greatest extent, an asynchronous session management procedure is proposed. To be specific, when the network side initiates session modification, the initiated session modification may not be immediately synchronized to the UE. When the UE is in an idle state, a network side node does not initiate a paging procedure to the UE, records an initiated session modification request as a to-be-processed message, and stores the session modification request message. If the UE initiates a location update procedure to the network side during a period in which no session modification request information is sent to the UE, currently, there is no corresponding session management method for the network side to process the to-be-processed message.

SUMMARY

Embodiments of the present application provide a session management method and a session management network element, to manage a session in a scenario in which a control plane connection of user equipment changes.

According to an aspect, an embodiment of the present application provides a session management method, including: receiving, by a first control plane network element, a user equipment UE context response message from a second control plane network element, where the UE context response message carries a first session message, and the first session message is a pending session message; and sending, by the first control plane network element, a second session message to user equipment according to the UE context response message.

In the solution of this embodiment of the present application, when a control plane connection of the user equipment changes and a pending session message that needs to be synchronized to the user equipment exists on a source control plane network element (corresponding to the second control plane network element) of the user equipment, the first control plane network element (a control plane network element newly connected to the user equipment) obtains the UE context response message from the second control plane network element, where the UE context response message carries the first session message, and the first session message is the foregoing pending session message. The first control plane network element sends the second session message to the user equipment according to the received UE context response message, so as to send the pending session message to the user equipment. In this way, a session can be managed in a scenario in which the control plane connection of the user equipment changes.

In an embodiment, the first session message is the same as the second session message. In this implementation, after receiving the UE context response message, the first control plane network element sends the pending session message carried in the UE context response message to the user equipment as the second session message.

In an embodiment, the second session message is generated based on the first session message. In this implementation, after receiving the UE context response message, the first control plane network element generates the second session message based on the first session message carried in the UE context response message, and sends the second session message to the user equipment as the pending session message.

In an embodiment, the second session message is a session management message; and the sending, by the first control plane network element, a second session message to user equipment according to the UE context response message includes:

sending, by the first control plane network element, a protocol data unit (PDU) session relocation response message to a mobility management (MM) network element according to the first session message, where the PDU session relocation response message carries the session management message, so that the MM network element sends the session management message to the user equipment.

In an embodiment, the second session message is a session management message; and the sending, by the first control plane network element, a second session message to user equipment according to the UE context response message includes:

sending, by the first control plane network element, a location update accept message to the user equipment according to the first session message, where the location update accept message carries the session management message.

In an embodiment, the second session message is a session management message; and the sending, by the first control plane network element, a second session message to user equipment according to the UE context response message includes:

sending, by the first control plane network element according to the first session message, a context setup request message to an access network element accessed by the user equipment, where the context setup request message carries the session management message, so that the access network element sends the session management message to the user equipment through radio resource control RRC reconfiguration.

In an embodiment, the second session message is a session management message; and the sending, by the first control plane network element, a second session message to user equipment according to the UE context response message includes:

sending, by the first control plane network element, a PDU session update response message to the user equipment according to the first session message, where the PDU session update response message carries the session management message.

In an embodiment, the sending, by the first control plane network element, the second session message to the user equipment includes:

determining, by the first control plane network element based on communication link bearer status information of the user equipment that is obtained in advance, a communication link that is in an active state; and sending, by the first control plane network element to the user equipment, the second session message corresponding to the communication link in the active state.

In an embodiment, before the receiving, by a first control plane network element, a UE context response message from a second control plane network element, the method further includes:

receiving, by the first control plane network element, a location update request message sent by the user equipment, where the location update request message carries information used to derive an address of the second control plane network element.

In an embodiment, before the receiving, by a first control plane network element, a UE context response message from a second control plane network element, the method further includes:

receiving, by the first control plane network element, a PDU session relocation request message sent by the MM network element, where the PDU session relocation request message carries information used to derive an address of the second control plane network element.

In an embodiment, before the receiving, by a first control plane network element, a UE context response message from a second control plane network element, the method further includes:

receiving, by the first control plane network element, a PDU session update request message sent by the user equipment, where the PDU session update request message carries information used to derive an address of the second control plane network element.

In an embodiment, the receiving, by a first control plane network element, a UE context response message from a second control plane network element includes:

sending, by the first control plane network element, a context request message to the second control plane network element; and receiving, by the first control plane network element, the UE context response message sent by the second control plane network element according to the context request message.

In an embodiment, the first control plane network element is a target SM network element, the second control plane network element is a source SM network element, and the UE context response message is an SM context response message.

In an embodiment, the method further includes:

sending, by the first control plane network element, a PDU session synchronization notification message to a policy function PF network element.

According to another aspect, an embodiment of the present application provides a session management network element. The network element has a function of implementing behavior of the first control plane network element in the foregoing method embodiment. The function may be implemented by hardware, or may be implemented by hardware by executing corresponding software. The hardware or the software includes one or more modules corresponding to the foregoing function.

In an embodiment, the network element is deployed in a first control plane network element and includes a receiving unit and a sending unit, where the receiving unit is configured to receive a user equipment UE context response message from a second control plane network element, where the UE context response message carries a first session message, and the first session message is a pending session message; and the sending unit is configured to send a second session message to user equipment according to the UE context response message.

In the solution of this embodiment of the present application, the sending unit is further configured to perform the sending operations in the foregoing method embodiment, and the receiving unit is further configured to perform the receiving operations in the foregoing method embodiment.

In an embodiment, the session management network element is deployed in a first control plane network element and includes a transmitter, a receiver, and a processor, where the receiver is configured to receive a UE context response message from a second control plane network element under control of the processor, where the UE context response message carries a first session message, and the first session message is a pending session message; and the transmitter is configured to send a second session message to user equipment according to the UE context response message under control of the processor.

In the solution of this embodiment of the present application, the transmitter is further configured to perform the sending operations in the foregoing method embodiment, and the receiver is further configured to perform the receiving operations in the foregoing method embodiment.

According to still another aspect, an embodiment of the present application provides a computer storage medium, configured to store a computer software instruction used by the foregoing session management network element, where the computer software instruction includes a program designed for executing the foregoing aspect.

According to the session management method and the session management network element in the embodiments of the present application, a session can be managed in a scenario in which a control plane connection of user equipment changes.

BRIEF DESCRIPTION OF DRAWINGS

To describe the technical solutions in the present application more clearly, the following briefly describes the accompanying drawings required for describing the embodiments. Apparently, a person of ordinary skill in the art may derive other drawings from these accompanying drawings without creative efforts.

FIG. 8A and FIG. 8B are a flowchart of a session management method according to Embodiment 6 of the present application;

DESCRIPTION OF EMBODIMENTS

A session management solution provided in embodiments of the present application may be applied to session management in various communications systems, and in particular, may be applied to session management in which a control plane network element connected to user equipment changes. For example, the solution in the embodiments of the present application may be applied to a communications system such as an EPS system or a 5G network.

The following describes in detail a session management method in the embodiments of the present application with reference to a specific system scenario. It should be noted that the system scenario described in the embodiments of the present application is intended to describe technical solutions of the embodiments of the present application more clearly, and does not constitute any limitations on the technical solutions provided in the embodiments of the present application. A person of ordinary skill in the art may know that, with evolution of a network architecture and emergence of a new service scenario, the technical solutions provided in the embodiments of the present application are also applicable to similar technical problems.

Figure 1:
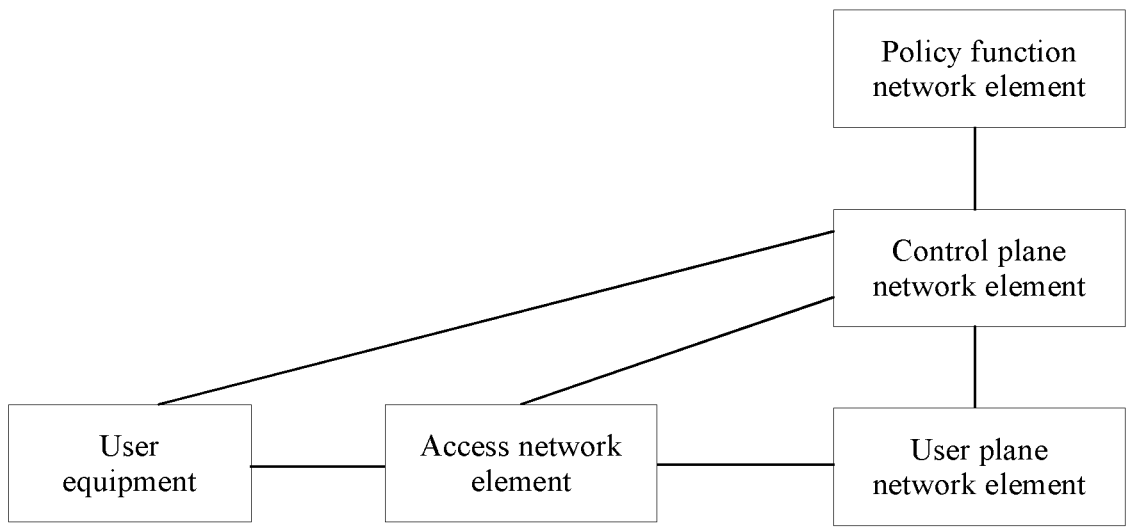
FIG. 1 is a schematic diagram of an embodiment of an application scenario according to the present application.

FIG. 1 is a schematic diagram of an embodiment of an application scenario according to the present application. In the scenario shown in FIG. 1, UE, an access network (AN) element, a user plane (UP) network element, a control plane (CP) network element, and a policy function (PF) network element are included.

Figure 2:
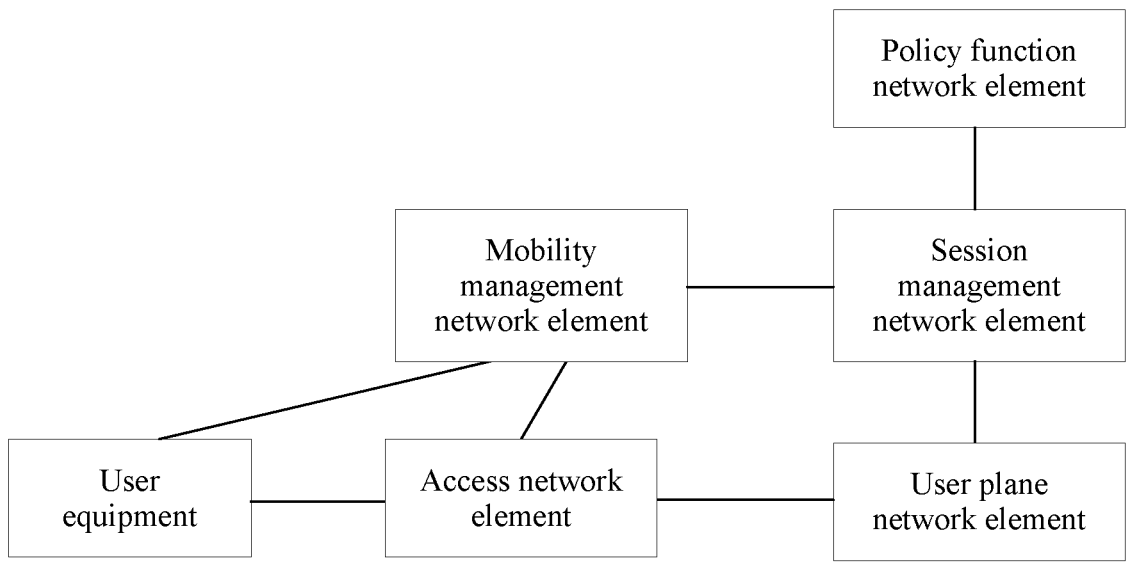
FIG. 2 is a schematic diagram of another embodiment of an application scenario according to the present application.

FIG. 2 is a schematic diagram of another embodiment of an application scenario according to the present application. In the scenario shown in FIG. 2, the CP network element is further divided into a mobility management (MM) network element and a session management (SM) network element on the basis of FIG. 1. As shown in FIG. 1, a CP function and a UP function in a core network are separated. Optionally, there may be a plurality of CP network elements and a plurality of UP network elements. The CP network element is used for signaling interaction, and the UP network element is used for data transmission.

For ease of understanding, an application scenario in the embodiments of the present application is first described with reference to the accompanying drawings. FIG. 1 is a schematic diagram of an application scenario according to an embodiment of the present application. In the application scenario, user equipment, an access network device, and a control plane function network element, a user plane function network element, and a policy function network element that are of a core network are included. As shown in FIG. 2, in some embodiments, the control plane function network element may include a mobility management network element and a session management network element.

The user equipment may be a mobile phone, a tablet computer, a notebook computer, a personal computer (PC), an ultra-mobile personal computer (UMPC), a netbook, a personal digital assistant (PDA), an in-vehicle device, or the like. For ease of description, in this application, the devices mentioned above are collectively referred to as user equipment or UE. The access network device may be an access device in an evolved Universal Mobile Telecommunications System (UMTS) terrestrial radio access network (E-UTRAN), such as an eNB (evolved Node B) or an access network device in a next generation access network (NG AN). The control plane function network element is used for implementing a control plane function, and is specifically used for signaling interaction. When the control plane function network element can include a mobility management network element and a session management network element, the mobility management network element is configured to execute processes such as registration management of the user equipment, accessibility testing, allocation of a network function of a control plane and a user plane, mobility management, addressing, and identifier management. The session management network element is configured to manage setup of an IP service connection of the UE and a non-IP service connection of the UE, and manage user planes corresponding to the connections. The user plane function network element is used for implementing a user plane function, and is specifically used for transmitting user data. The policy function network element is used for policy decision, policy provisioning, event reporting, and the like. The policy includes, for example, a Quality of Service (QoS) control policy, a charging policy, a session management policy, and a mobility management policy.

It should be noted that, in actual application deployment, there may be more than one control plane network element in FIG. 1, and there may be more than one session management network element in FIG. 2.

The following embodiments of session management methods are described by using an example in which the user equipment is UE.

Embodiment 1

Figure 3:
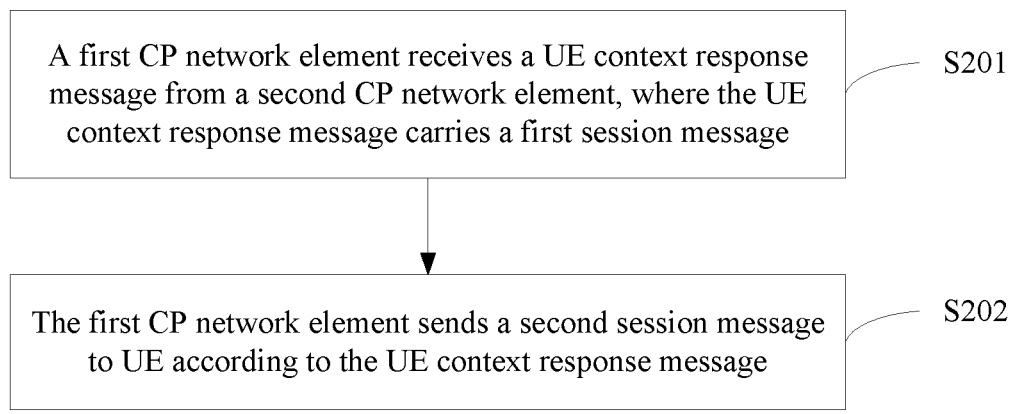
FIG. 3 is a flowchart of a session management method according to Embodiment 1 of the present application.

FIG. 3 is a flowchart of a session management method according to Embodiment 1 of the present application. The method shown in FIG. 3 may be performed based on FIG. 1, FIG. 2, or another similar scenario. For example, in the scenario shown in FIG. 1, a control plane network element connected to the UE after a control plane connection changes is referred to as a first CP network element, and a source CP network element connected to the UE before the control plane connection changes is referred to as a second CP network element. For another example, in the scenario shown in FIG. 2, a control plane network element connected to the UE after a control plane connection changes is referred to as a target SM network element, and a control plane network element connected to the UE before the control plane connection changes is referred to as a source SM network element. In the scenario in FIG. 1, an execution body of the method in this embodiment of the present application is the first CP network element. In the scenario in FIG. 2, an execution body of the method in this embodiment of the present application is the target SM network element. For ease of description, in the solution in this embodiment, the first CP network element is used as an execution body for description.

As shown in FIG. 3, the method in this embodiment of the present application includes the following operations.

Operation S201: The first CP network element receives a UE context response message from the second CP network element, where the UE context response message carries a first session message, and the first session message is a pending session message.

Operation S202: The first CP network element sends a second session message to the UE according to the UE context response message.

The foregoing first session message may be a session management message. For example, the first session message includes an unprocessed session management message received by the second CP network element and/or a session management message that has not sent by the second CP network element to the UE. More specifically, the first session message may be a session management message of a non-access stratum (NAS) that is generated by the second CP network element based on the received unprocessed session management message, and further, the session management message may include pending session information.

In an embodiment, the second session message is the same as the first session message. For example, the second session message is a session management message that is the same as the first session message.

In another embodiment, the second session message is generated based on the first session message. For example, the first session message is a first session management message, and the second session message is a second session management message. That the first CP network element sends a second session message to the UE according to the UE context response message includes: generating, by the first CP network element, the second session management message based on the first session management message; and sending, by the first CP network element, the second session management message to the UE. For example, the first session management message is a session management message of the NAS, and the second session message is a session management request message generated based on the session management message of the NAS.

In the solution in this embodiment of the present application, after receiving the UE context response message, the first CP network element further needs to determine whether the pending session message needs to be sent to the UE. A specific manner includes: determining, by the first CP network element, whether the UE context response message received from the second CP network element includes the first session message; and if the UE context response message includes the first session message, performing, by the first CP network element, the operation of sending the second session message to the UE. For example, the first CP network element directly sends the first session message to the UE as the second session message, or generates the second session message based on the first session message, and sends the second session message to the UE.

In another manner, the first CP network element obtains, in advance from the UE, status information of a communication link of a session set up between the UE and a network. After receiving the UE context response message, the first CP network element determines, based on the status information, whether a communication link in an active state exists and whether a session message corresponding to the communication link in the active state exists in the first session message; and if the session message corresponding to the communication link in the active state exists, the first CP network element sends the session message corresponding to the communication link in the active state to the UE as the second session message, or the first CP network element generates the second session message based on the session message corresponding to the communication link in the active state, and sends the second session message to the UE.

In the solution of this embodiment of the present application, both the first session message and the second session message may include pending session information.

In another embodiment, in order that a session context that is not sent by the second CP network element to the UE is sent by the first CP network element to the UE, the UE context response message received by the first CP network element may directly carry pending session information that needs to be synchronized to the UE, and the corresponding first CP network element sends the pending session information in the UE context response message to the UE.

The foregoing pending session information may include original pending session information received by the second CP network element, and processing such as parsing or converting is required after the first CP network element receives the original pending session information. Further, the foregoing pending session information may further include session information that may be directly sent to the UE without conversion. More specifically, the foregoing pending session information includes context information corresponding to one or more communication links in a session set up between the UE and the network. For example, the pending session information includes identifier information, status information, QoS information, and service flow information that are of the one or more communication links.

Embodiment 2

Figure 4A:
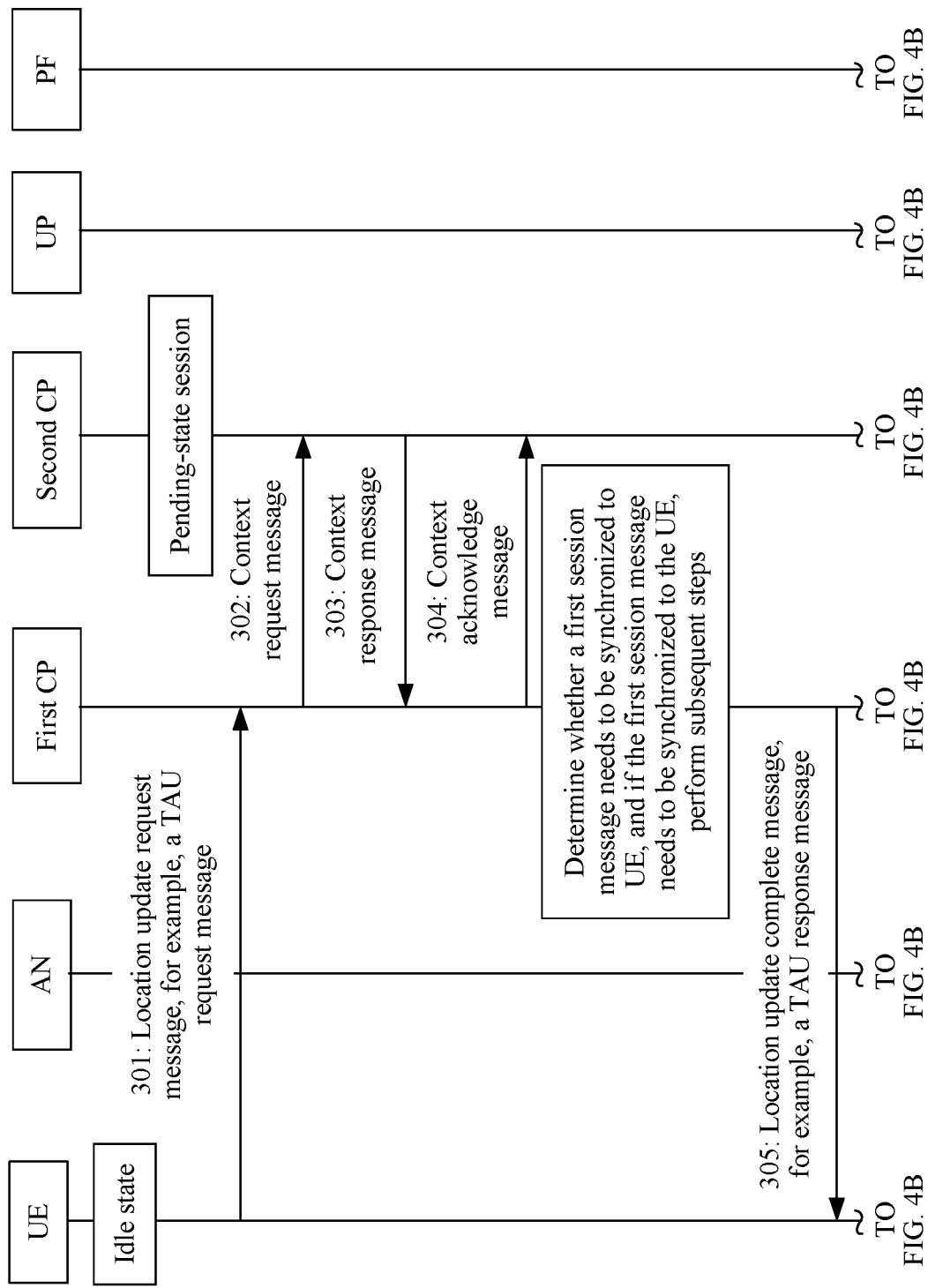
FIG. 4A and FIG. 4B are a flowchart of a session management method according to Embodiment 2 of the present application.
Figure 4B:
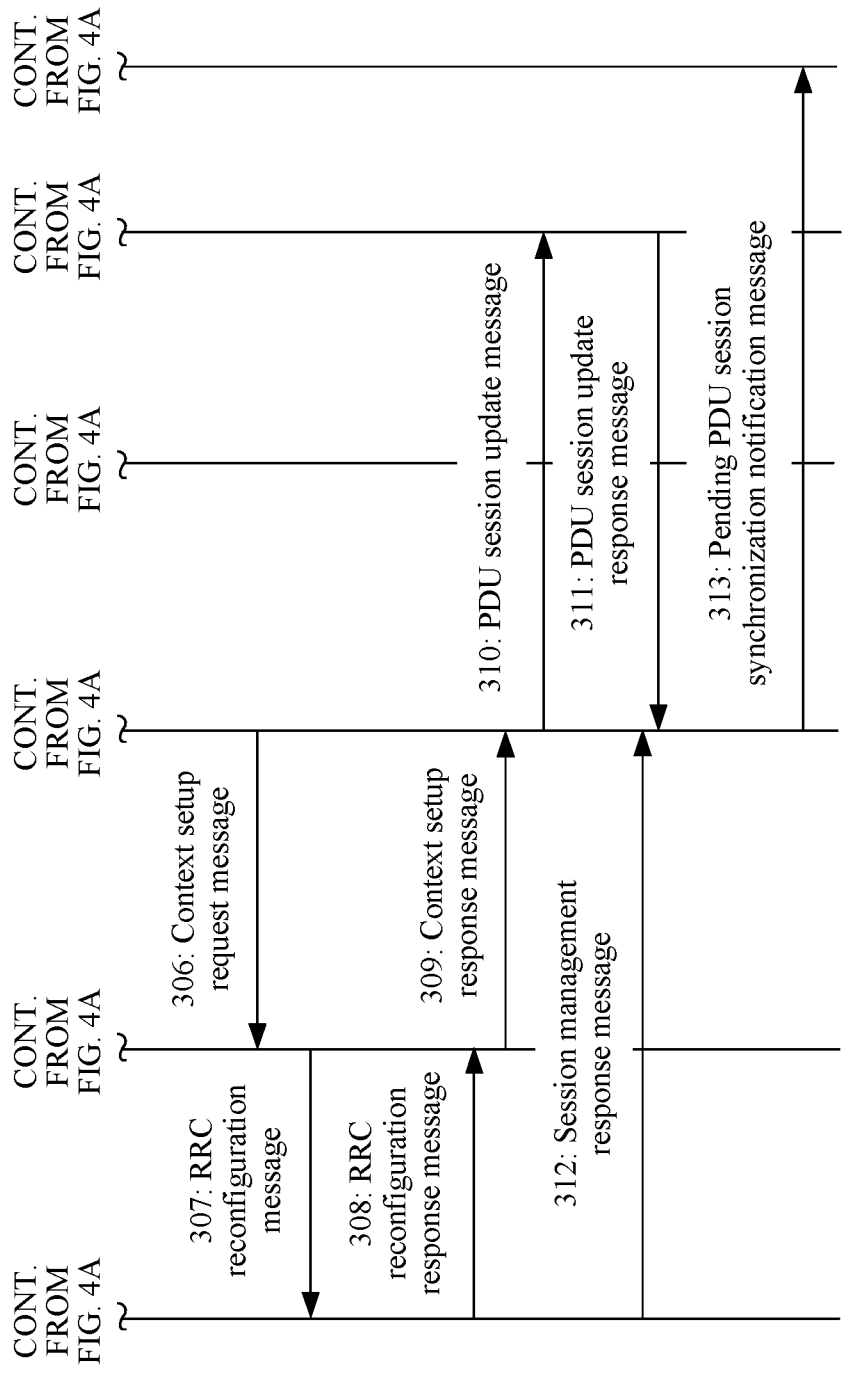

FIG. 4A and FIG. 4B are a flowchart of a session management method according to Embodiment 2 of the present application. The method shown in FIG. 4A and FIG. 4B is performed based on the scenario shown in FIG. 1. In the solution in this embodiment of the present application, a control plane network element connected to the UE after a control plane connection changes is referred to as a first CP network element, and a source CP network element connected to the UE before the control plane connection changes is referred to as a second CP network element. Processing operations of the method shown in FIG. 4A and FIG. 4B are as follows.

Operation S301: The UE sends a location update request message to the first CP network element.

For example, when the UE is in an idle state and needs to initiate location update, the UE sends a location update request message to the first CP network element.

The location update request message may be a tracking area update (TAU) request message. When the location update request message is a TAU request message, the TAU request message may carry information used to derive an address of the second CP network element connected to the UE before the CP connection changes, and user equipment identity information allocated by the second CP network element to the UE, for example, a globally unique temporary UE identity (GUTI). Further, the TAU request message may further carry status information of a communication link of a session set up between the UE and a network, for example, bearer status information.

Operation S302: The first CP network element sends a context request message (Context request message) to the second CP network element.

In this operation, the first CP network element derives the address of the second CP network element based on the information carried in the TAU request message. The first CP network element sends the context request message to the second CP network element.

Operation S303: The second CP network element sends a UE context response message (Context response message) to the first CP network element.

The UE context response message carries a first session message. For a specific format and content of the first session message, refer to Embodiment 1. Details are not described again.

Operation S304: The first CP network element sends a context acknowledge message (Context Acknowledge message) to the second CP network element.

Specifically, after receiving the UE context response message, the first CP network element sends the context acknowledge message to the second CP network element, so as to notify the second CP network element that the first CP network element has received the UE context response message, and further, the second CP network element may delete context information of the UE or identify that the context information of the UE is invalid or unavailable.

Optionally, after receiving the UE context response message, the first CP network element further determines whether the first session message in the UE context response message needs to be sent to the UE. For a determining method, refer to Embodiment 1. When the first CP network element determines that the first session message needs to be sent to the UE, the first CP network element performs all subsequent operations in this embodiment. If the first CP network element determines that the first session message does not need to be sent to the UE, the first CP network element performs an operation in operations S305, S310, and S313.

Operation S305: The first CP network element sends a location update complete message to the UE, for example, a TAU accept message (TAU Accept message).

It should be noted that operation S305 may be performed at any time after operation S304 is performed. For example, in another embodiment solution, operation S305 may also be performed after operation S312 in this embodiment of the present application. This is not limited herein.

Operation S306: The first CP network element sends a context setup request message (Context Setup request message) to an AN element.

The context setup request message carries a second session message. Optionally, the second session message is a session management message. For example, the second session message is a session management message. Specifically, the session management message includes context information corresponding to a plurality of communication links in a session set up between the UE and a network. Specifically, session information may include an identifier of a communication link, QoS information and service flow information used by the communication link, and the like. The session information may include updated communication link information determined based on a pending session.

Further, the context setup request message may further include one or more pending session management requests, and the pending session management requests include modified context information corresponding to a communication link in a session set up between the UE and a network. Specific information may include QoS information, service flow information, and the like.

Specifically, when the first session message needs to be updated to the UE, for example, pending session information carried in the first session message needs to be updated to the UE, the first CP network element sends the context setup request message to the AN element.

When there are a plurality of pending sessions in the first session message, the plurality of pending sessions may be placed in one session management message or respectively included in a plurality of session management messages.

Further, optionally, the foregoing context setup request message may also be a context modification request message or another request message used for session management.

Operation S307: The AN element sends a radio resource control (RRC) reconfiguration message (RRC reconfig message) to the UE.

The RRC reconfiguration message includes one or more session management messages.

Specifically, after receiving the context setup request message, the AN element sends an RRC reconfiguration message including one or more session management messages to the UE.

After receiving the session management message, the UE executes a process of sending a pending session to the UE.

Operation S308: The UE sends an RRC reconfiguration response message (RRC reconfig response message) to the AN element.

The RRC reconfiguration response message includes a session management response message. The session management response message includes a result value of session synchronization of the UE, for example, the synchronization succeeds or the synchronization fails. When the synchronization fails, a cause value of the failure is carried, for example, a communication link has been deleted.

Specifically, after receiving an RRC reconfiguration message, the UE updates session information on the UE based on a session management request in the RRC reconfiguration message, and generates, based on the RRC reconfiguration message, an RRC reconfiguration response message that includes a session management response message. The session management response message is a response message of the UE to the session management request.

Operation S309: The AN element sends a context setup response message (Context Setup response message) to the first CP network element.

The context setup response message includes a session management response message.

Specifically, after receiving an RRC reconfiguration response message, the AN element sends a context setup response message to the first CP network element.

Operation S310: The first CP network element sends a protocol data unit (PDU) session update message (PDU session update message) to a UP network element.

Specifically, the first CP network element sends a PDU session update message to the user plane function network element, so as to instruct the UP network element to execute a synchronous update procedure of a session context. If the PDU session update message indicates that session information on the UE has been deleted, the PDU session update message instructs the UP network element to delete corresponding session information. If the PDU session update message indicates that the UE has executed a session synchronization process, the PDU session update message instructs the UP network element to execute a corresponding session synchronization process. After completing the session update procedure, the UP network element optionally performs operation 311.

Operation S311: The UP network element sends a PDU session update response message (PDU session update response message) to the first CP network element.

In a specific implementation of this embodiment of the present application, the session management method shown in FIG. 4A and FIG. 4B may further include operation S312: The UE sends a session management response message to the first CP network element.

Specifically, after receiving an RRC reconfiguration message sent by the AN element, the UE generates a session management response message based on a session management request in the RRC reconfiguration message, and sends the session management response message to the first CP network element. In this case, the RRC reconfiguration response message in operation S308 and the context setup response message in operation S309 do not include a session management response message.

If the first CP network element selects a new user plane network element, the PDU session update message and the PDU session update response message in S310 and S311 are changed to a PDU session setup request message and a PDU session setup response message.

In addition, in a specific implementation of this embodiment of the present application, the session management method shown in FIG. 4A and FIG. 4B may further include operation S313: The first CP network element sends a pending PDU session synchronization notification message (Pending PDU session synchronized notification message) to a PF network element. After receiving the pending PDU session synchronization notification message, the PF network element sets a session to a synchronization state.

It should be noted that, the first session message and the second session message in this embodiment of the present application may be a same message. In addition, the second session message may alternatively be a message generated based on the first session message. For a specific generation method, refer to Embodiment 1. In addition, in this embodiment, for a part about the first session message and the second session message that is not described in this embodiment, refer to Embodiment 1.

In the solution of this embodiment of the present application, when a CP network element connected to the UE changes, a CP network element newly connected to the UE can obtain a to-be-updated session context from the source CP network element, to execute an update procedure of a pending session. Further, if session information on the UE has been deleted, the UE instructs the CP network element to initiate a session update procedure to the UP network element.

Embodiment 3

Figure 5:
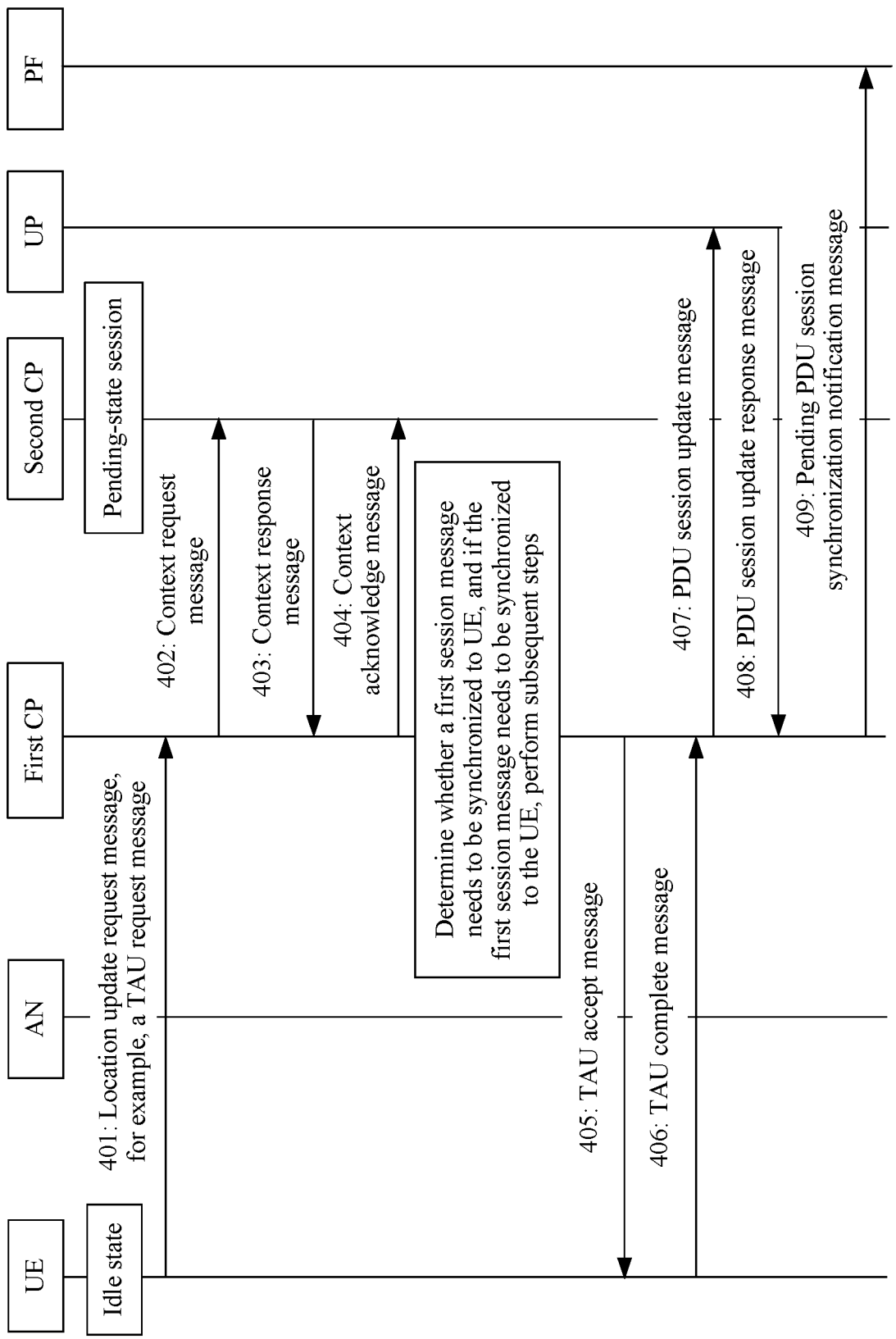
FIG. 5 is a flowchart of a session management method according to Embodiment 3 of the present application.

FIG. 5 is a flowchart of a session management method according to Embodiment 3 of the present application. The method shown in FIG. 5 is performed based on the scenario shown in FIG. 1. In the solution in this embodiment of the present application, a control plane network element connected to the UE after a control plane connection changes is referred to as a first CP network element, and a source CP network element connected to the UE before the control plane connection changes is referred to as a second CP network element. Processing operations of the method shown in FIG. 5 are as follows.

Operation S401: The UE sends a location update request message to the first CP network element.

For example, when the UE is in an idle state and needs to initiate location update, the UE sends a location update request message to the first CP network element.

The location update request message may be a tracking area update (TAU) request message (TAU request message). When the location update request message is a TAU request message, the TAU request message may carry information used to derive an address of the second CP network element connected to the UE before the CP connection changes, and user equipment identity information allocated by the second CP network element to the UE, for example, a globally unique temporary UE identity (GUTI). Further, the TAU request message may further carry bearer status information of a communication link of a session set up between the UE and a network.

Operation S402: The first CP network element sends a context request message (Context request message) to the second CP network element.

In this operation, the first CP network element derives the address of the second CP network element based on the information carried in the TAU request message. The first CP network element sends the context request message to the second CP network element.

Operation S403: The second CP network element sends a UE context response message (Context response message) to the first CP network element.

The UE context response message carries a first session message. For a specific format and content of the first session message, refer to Embodiment 1. Details are not described again.

Operation S404: The first CP network element sends a context acknowledge message (Context Acknowledge message) to the second CP network element.

Optionally, after receiving the UE context response message, the first CP network element further determines whether the first session message needs to be sent to the UE. For a determining method, refer to Embodiment 1. When the first CP network element determines that the first session message needs to be sent to the UE, the first CP network element performs all subsequent operations in this embodiment. If the first CP network element determines that the first session message does not need to be sent to the UE, the first CP network element performs operations S405 and S407.

Operation S405: The first CP network element sends a location update complete message to the UE, for example, a TAU accept message (TAU Accept message).

The TAU accept message carries a second session message. Optionally, the second session message is a session management message. For example, the second session message is a session management message. Specifically, the session management message includes context information corresponding to a plurality of communication links in a session set up between the UE and a network. Specifically, session information may include an identifier of a communication link, QoS information and service flow information used by the communication link, and the like. The session information may include updated communication link information determined based on a pending session.

Further, the TAU accept message may include one or more pending session management requests, and the pending session management requests include modified context information corresponding to a communication link in a session set up between the UE and a network. Specific information may include QoS information, service flow information, and the like.

When pending session information needs to be updated to the UE, the first CP network element sends a TAU accept message to the UE.

Operation S406: The UE sends a location update complete message to the first CP network element, for example, a TAU complete message (TAU Complete message).

The TAU complete message includes a session management response message. The session management response message includes a result value of session synchronization of the UE, for example, the synchronization succeeds or the synchronization fails. When the synchronization fails, a cause value of the failure is carried, for example, a communication link has been deleted.

After receiving a TAU accept message, the UE executes a session synchronization process based on a session management message in the TAU accept message, and generates, after the session synchronization process is completed, a TAU complete message that includes a session management response message. The session management response message is a response of the UE to the session management message.

Operation S407: The first CP network element sends a PDU session update message to a UP network element.

The first CP network element sends a PDU session update message to the user plane function network element, so as to instruct the UP network element to execute a synchronous update procedure of a session context. If the PDU session update message indicates that session information on the UE has been deleted, the PDU session update message instructs the UP network element to delete corresponding session information. If the PDU session update message indicates that the UE has executed a session synchronization process, the PDU session update message instructs the UP network element to execute a corresponding session synchronization process. After completing the session update procedure, the UP network element optionally performs operation S408.

Operation S408: The UP network element sends a PDU session update response message (PDU session update response message) to the first CP network element.

If the first function network element selects a new UP network element, the PDU session update message and the PDU session update response message in S407 and S408 are changed to a PDU session setup request message and a PDU session setup response message.

In a specific implementation of this embodiment of the present application, the session management method shown in FIG. 5 may further include operation S409: The first CP network element sends a pending PDU session synchronization notification message (Pending PDU session synchronized notification message) to a PF network element. After receiving the pending PDU session synchronization notification message, the PF network element sets a session to a synchronization state.

It should be noted that, the first session message and the second session message in this embodiment of the present application may be a same message. In addition, the second session message may alternatively be a message generated based on the first session message. For a specific generation method, refer to Embodiment 1. In addition, in this embodiment, for a part about the first session message and the second session message that is not described in this embodiment, refer to Embodiment 1.

In the solution of this embodiment of the present application, when a CP network element connected to the UE changes, a CP network element newly connected to the UE can obtain a to-be-updated session context from the source CP network element, to execute an update procedure of a pending session. Further, if session information on the UE has been deleted, the UE instructs the CP network element to initiate a session update procedure to the UP network element.

Embodiment 4

Figure 6A:
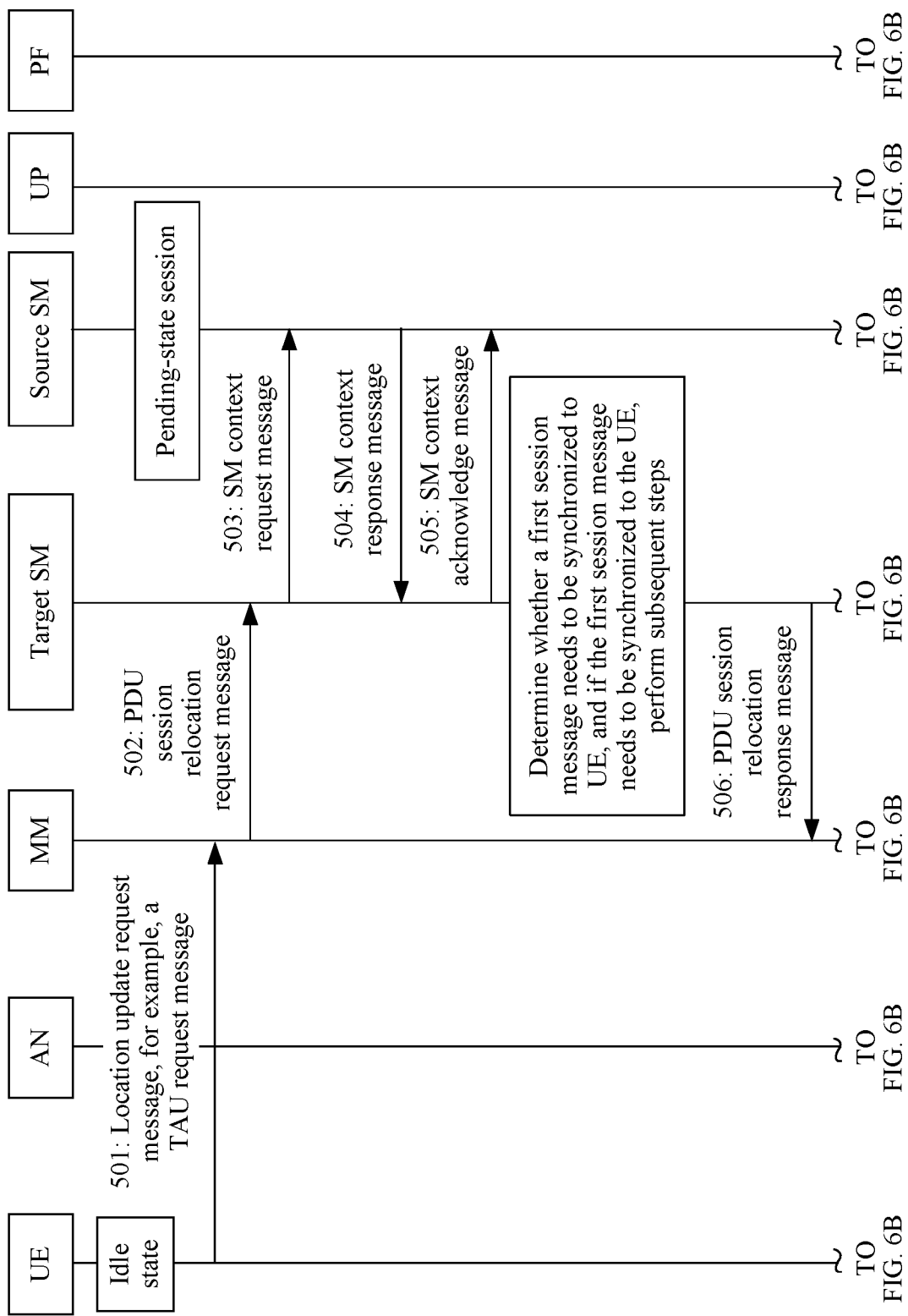
FIG. 6A and FIG. 6B are a flowchart of a session management method according to Embodiment 4 of the present application.
Figure 6B:
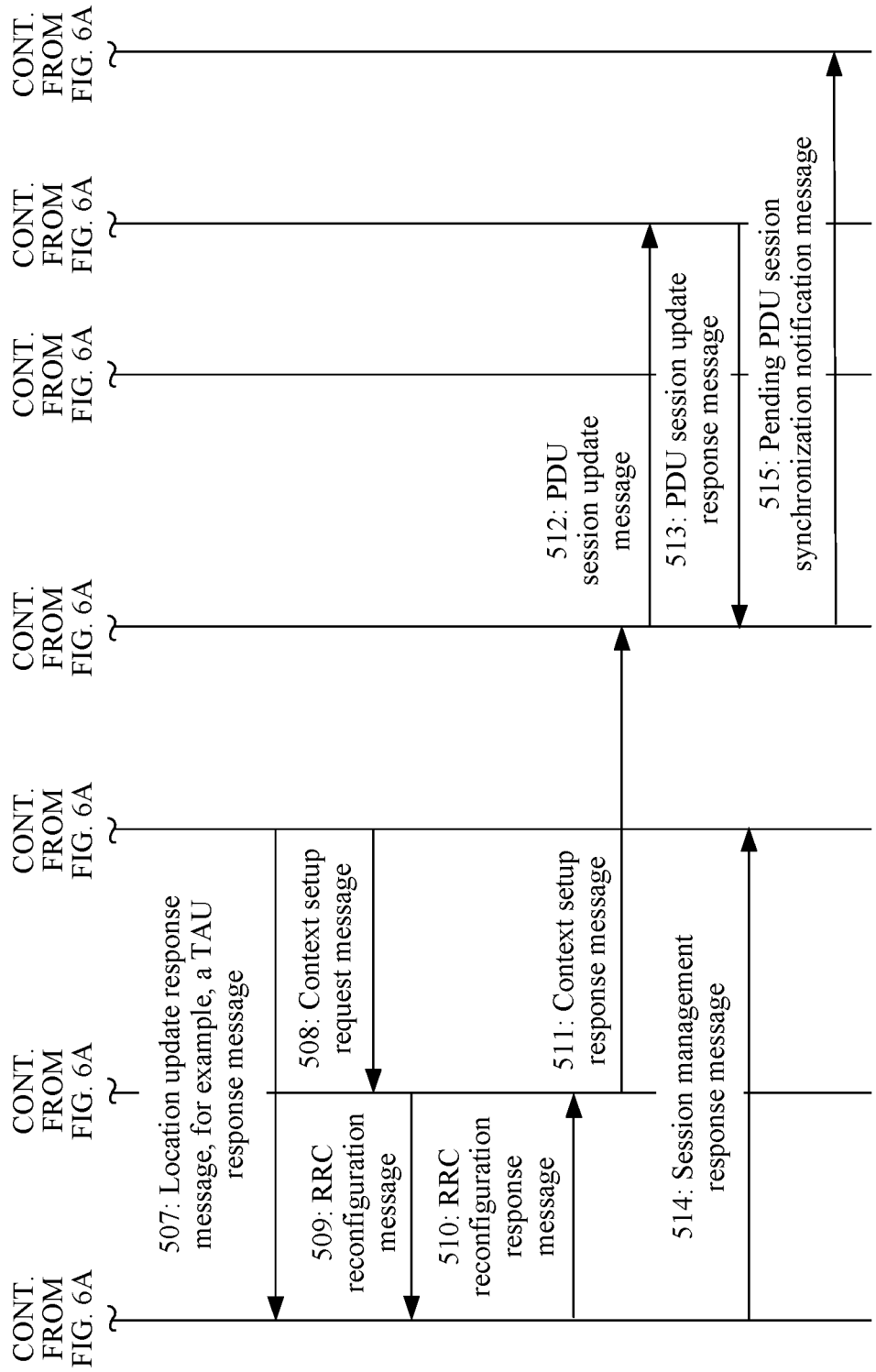

FIG. 6A and FIG. 6B are a flowchart of a session management method according to Embodiment 4 of the present application. The method shown in FIG. 6A and FIG. 6B is performed based on the scenario shown in FIG. 2. In the solution in this embodiment of the present application, an SM network element connected to the UE after a control plane connection changes is referred to as a target SM network element, and an SM network element connected to the UE before the connection changes is referred to as a source SM network element. Processing operations of the method shown in FIG. 6A and FIG. 6B are as follows.

Operation S501: The UE sends a location update request message to an MM network element.

For example, when the UE is in an idle state and needs to initiate location update, the UE sends a location update request message to the MM network element. The location update request message may be a TAU request message (TAU request message). The TAU request message carries information about the target SM network element.

Operation S502: The MM network element sends a PDU session relocation request message (PDU session relocation request message) to the target SM network element.

After receiving a TAU request message from the UE, the MM network element determines the target SM network element as a target session management network element based on information about the target SM network element in the TAU request message, and sends a PDU session relocation request message to the target SM network element. The PDU session relocation request message includes information used to derive an address of the source SM network element and temporary user equipment identity information allocated by the source SM network element to the UE, for example, a GUTI (globally unique temporary UE identity). The source SM network element herein is a session management network element that previously manages a session context of the UE. Further, the TAU request message may further carry bearer status information of a communication link of a session set up between the UE and a network.

Operation S503: The target SM network element sends an SM context request message (SM Context request message) to the source SM network element.

In this operation, after the target SM network element receives a PDU session relocation request message, the target SM network element determines the address of the source SM network element based on the PDU session relocation request message. Then, the target SM network element sends the SM context request message to the source SM network element.

Operation S504: The source SM network element sends an SM context response message (SM Context response message) to the target SM network element.

The SM context response message carries a first session message. For a specific format and content of the first session message, refer to Embodiment 1. Details are not described again.

Operation S505: The target SM network element sends an SM context acknowledge message (SM Context Acknowledge message) to the source SM network element.

Specifically, after receiving the SM context response message, the target SM network element sends the SM context acknowledge message to the source SM network element, so as to notify the source SM network element that the target SM network element has received the SM context response message, and further, the source SM network element may delete context information of the UE or identify that context information of the UE is invalid or unavailable.

Optionally, after receiving the SM context response message, the target SM network element further determines whether the first session message in the SM context response message needs to be sent to the UE. For a determining method, refer to Embodiment 1. When the target SM network element determines that the first session message needs to be sent to the UE, the target SM network element performs all subsequent operations in this embodiment. If the target SM network element determines that the first session message does not need to be sent to the UE, the target SM network element performs an operation such as operation S506, operation S512, operation S513, or operation S515.

Operation S506: The target SM network element sends a PDU session relocation response message (PDU session relocation response message) to the MM network element.

It should be noted that, in a specific implementation process of this embodiment of the present application, operation 506 only needs to be performed after operation 504.

Operation S507: The MM network element sends a location update response message to the UE, for example, a TAU response message (TAU response message).

It should be noted that, in a specific implementation process of this embodiment of the present application, operation S507 only needs to be performed after operation S501.

Operation S508: The target SM network element sends a context setup request message (Context Setup request message) to an AN element.

The context setup request message carries a second session message. Optionally, the second session message is a session management message. For example, the second session message is a session management message. Specifically, the second session message includes context information corresponding to a plurality of communication links in a session set up between the UE and a network. Specifically, session information may include an identifier of a communication link, QoS information and service flow information used by the communication link, and the like. The session information may include updated communication link information determined based on a pending session.

Further, the context setup request message includes one or more pending session management requests, and the pending session management requests include modified context information corresponding to a communication link in a session set up between the UE and a network. Specific information may include QoS information, service flow information, and the like.

Specifically, when pending session information needs to be updated to the UE, the target SM network element sends the context setup request message to the AN element.

Operation S509: The AN element sends an RRC reconfiguration message (RRC reconfig message) to the UE.

The RRC reconfiguration message includes one or more pending session management messages.

Specifically, after receiving the context setup request message, the AN element sends an RRC reconfiguration message including one or more session management messages to the UE.

Operation S510: The UE sends an RRC reconfiguration response message (RRC reconfig response message) to the AN element.

The RRC reconfiguration response message includes one or more pending session management response messages. The pending session management response message includes a result value of performing pending session synchronization of the UE, for example, the synchronization succeeds or the synchronization fails. Further, when the synchronization fails, a cause value of the failure is included, for example, a communication link is deleted.

Specifically, after receiving an RRC reconfiguration message, the UE executes a session synchronization process based on a session management request in the RRC reconfiguration message, and generates, based on the RRC reconfiguration message, an RRC reconfiguration response message that includes a session management response. The session management response message is a response message of the UE to the session management request.

Operation S511: The AN element sends a context setup response message (Context Setup response message) to the target SM network element.

The context setup response message includes a session management response message.

Specifically, after receiving an RRC reconfiguration response message, the AN element sends a context setup response message to the target SM network element.

The RRC reconfiguration response message includes a session management response message. The session management response message includes a result value of session synchronization of the UE, for example, the synchronization succeeds or the synchronization fails. When the synchronization fails, a cause value of the failure is carried, for example, a communication link has been deleted.

Operation S512: The target SM network element sends a PDU session update message to a UP network element.

Specifically, the target SM network element sends a PDU session update message to the UP network element, so as to instruct the UP network element to execute a synchronous update procedure of a session context. If the PDU session update message indicates that session information on the UE has been deleted, the PDU session update message instructs the UP network element to delete corresponding session information. If the PDU session update message indicates that the UE has executed a session synchronization process, the PDU session update message instructs the UP network element to execute a corresponding session synchronization process. After completing the session update procedure, the UP network element optionally performs operation S513.

Operation S513: The UP network element sends a PDU session update response message (PDU session update response message) to the target SM network element.

In a specific implementation of this embodiment of the present application, the session management method shown in FIG. 6A and FIG. 6B may further include operation 514: The UE sends a session management response message to the target SM network element.

Specifically, after receiving an RRC reconfiguration message sent by the AN element, the UE generates a session management response message based on a session management request in the RRC reconfiguration message, and sends the session management response message to the target SM network element. In this case, the RRC reconfiguration response message and the context setup response message and the context setup response message do not include a session management response message.

In addition, in a specific implementation of this embodiment of the present application, the session management method shown in FIG. 6A and FIG. 6B may further include operation S515: The target SM network element sends a pending PDU session synchronization notification message (Pending PDU session synchronized notification message) to a PF network element. After receiving the pending PDU session synchronization notification message, the PF network element sets a session to a synchronization state.

It should be noted that, the first session message and the second session message in this embodiment of the present application may be a same message. In addition, the second session message may alternatively be a message generated based on the first session message. For a specific generation method, refer to Embodiment 1. In addition, in this embodiment, for a part about the first session message and the second session message that is not described in this embodiment, refer to Embodiment 1.

As provided in this embodiment of the present application, in a scenario in which SM and MM are separated, when an SM network element connected to the UE changes, an SM network element newly connected to the UE can obtain a to-be-updated session context from the source SM network element, to execute an update procedure of a pending session. Further, if session information on the UE has been deleted, the UE instructs the SM network element to initiate a session update procedure to the UP network element.

Embodiment 5

Figure 7A:
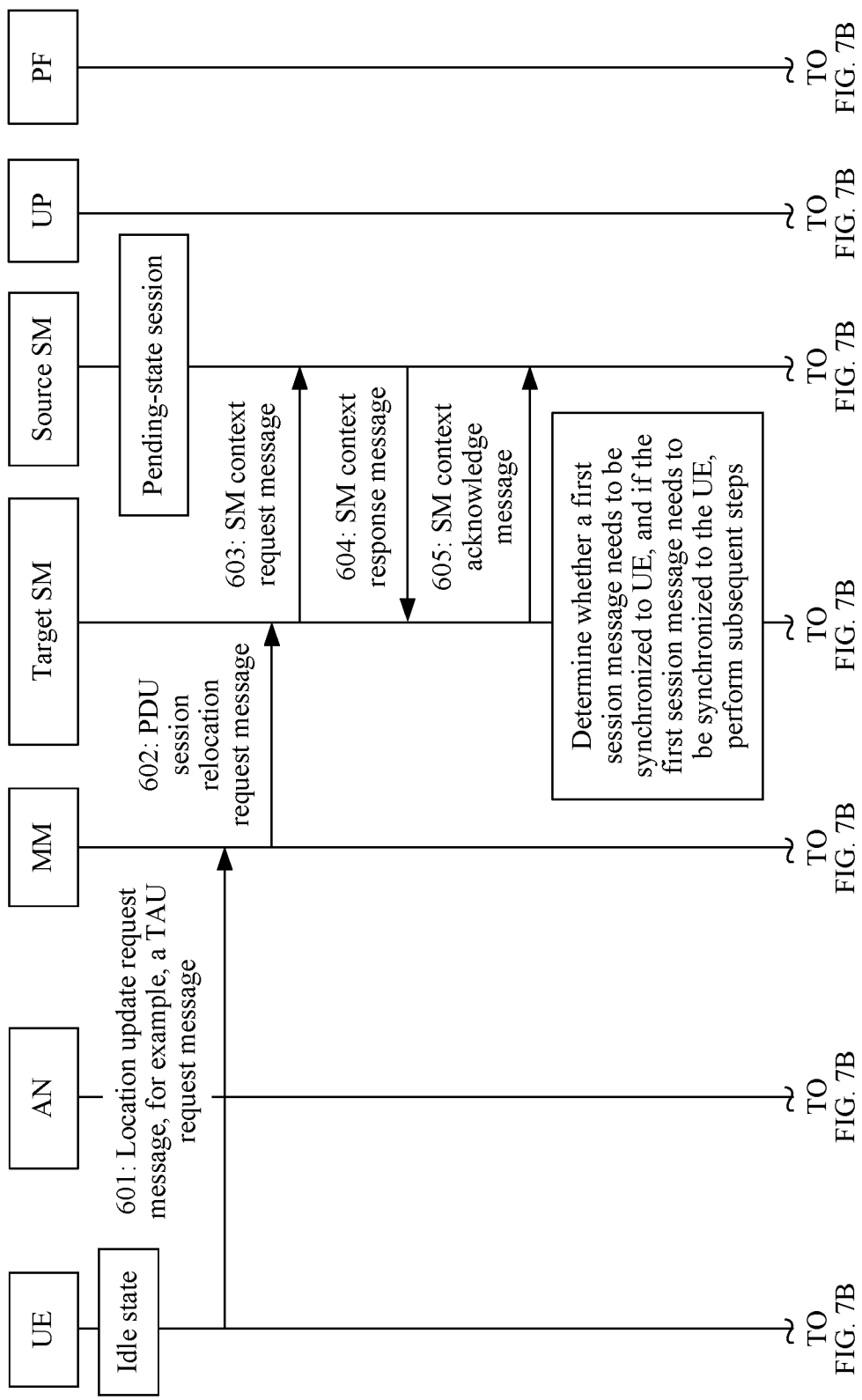
FIG. 7A and FIG. 7B are a flowchart of a session management method according to Embodiment 5 of the present application.
Figure 7B:
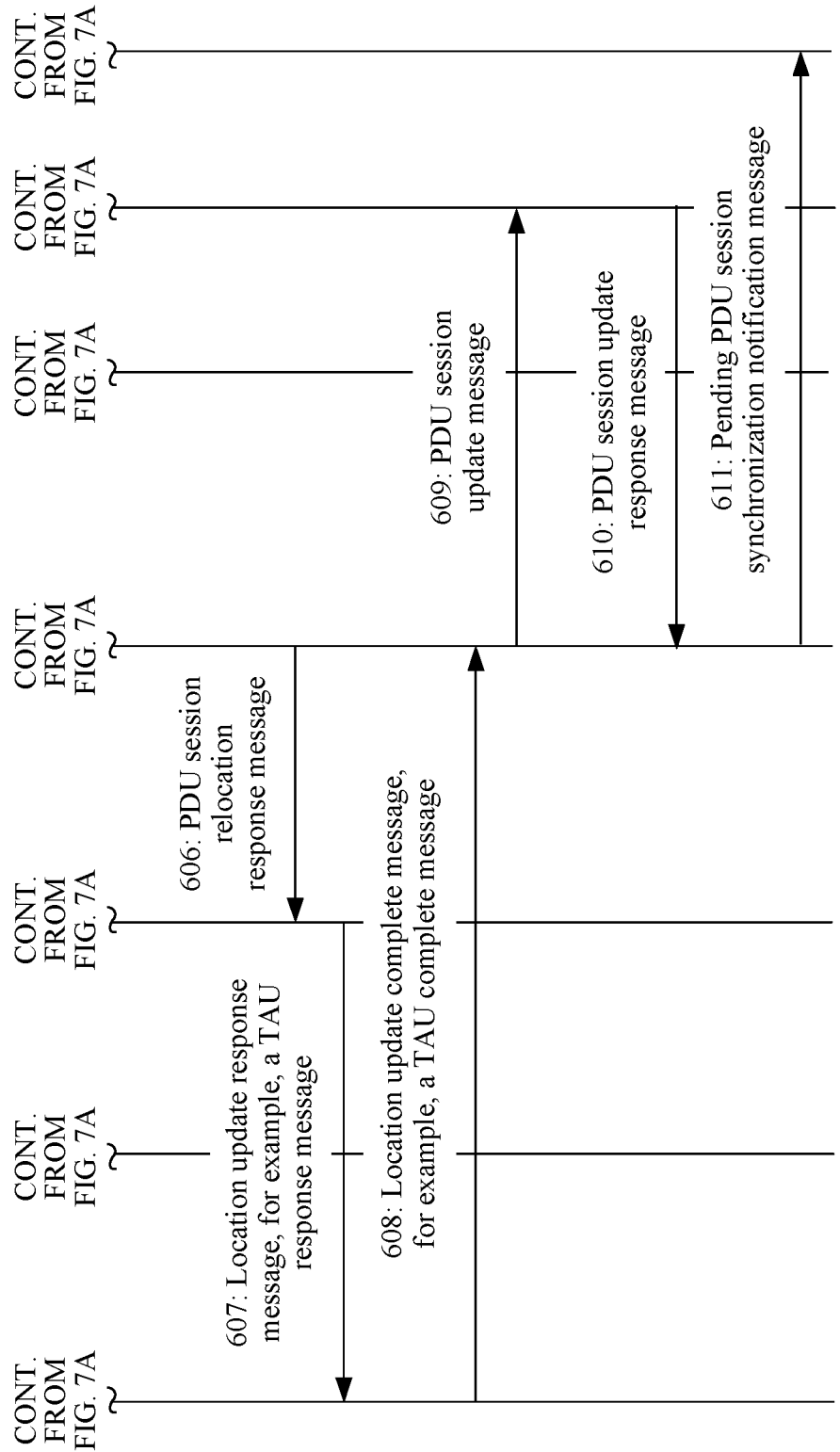

FIG. 7A and FIG. 7B are a flowchart of a session management method according to Embodiment 5 of the present application. The method shown in FIG. 7A and FIG. 7B is performed based on the scenario shown in FIG. 2. In the solution in this embodiment of the present application, an SM network element connected to the UE after a control plane connection changes is referred to as a target SM network element, and an SM network element connected to the UE before the connection changes is referred to as a source SM network element. Processing operations of the method shown in FIG. 7A and FIG. 7B are as follows.

Operation S601: The UE sends a location update request message to an MM network element.

For example, when the UE is in an idle state and needs to initiate location update, the UE sends a location update request message to the MM network element. The location update request message may be a TAU request message (TAU request message). The TAU request message carries information about the target SM network element.

Operation S602: The MM network element sends a PDU session relocation request message (PDU session relocation request message) to the target SM network element.

After receiving a TAU request message from the UE, the MM network element determines the target SM network element as a target session management network element based on information about the target SM network element in the TAU request message, and sends a PDU session relocation request message to the target SM network element. The PDU session relocation request message includes information used to derive an address of the source SM network element and temporary user equipment identity information allocated by the source SM network element to the UE, for example, a globally unique temporary UE identity (GUTI). The source SM network element herein is a session management network element that previously manages a session context of the UE.

Operation S603: The target SM network element sends an SM context request message (SM Context request message) to the source SM network element.

In this operation, after the target SM network element receives the PDU session relocation request message, the target SM network element determines the address of the source SM network element based on the PDU session relocation request message. Then, the target SM network element sends the SM context request message to the source SM network element.

Operation S604: The source SM network element sends an SM context response message (SM Context response message) to the target SM network element.

The SM context response message carries a first session message. For a specific format and content of the first session message, refer to Embodiment 1. Details are not described again.

Operation S605: The target SM network element sends an SM context acknowledge message (Context Acknowledge message) to the source SM network element.

After receiving the SM context response message, the target SM network element sends the SM context acknowledge message to the source SM network element, so as to notify the source SM network element that the target SM network element has received the SM context response message, and further, the source SM network element may delete context information of the UE or identify that context information of the UE is invalid or unavailable.

Further, after receiving the SM context response message, the target SM network element may further determine whether the first session message needs to be sent to the UE. For a determining method, refer to Embodiment 1. When the target SM network element determines that the first session message needs to be sent to the UE, the target SM network element performs all subsequent operations in this embodiment. If the target SM network element determines that the first session message does not need to be sent to the UE, the target SM network element performs subsequent operations in operations S606, S609, and S611.

Operation S606: The target SM network element sends a session relocation response message (PDU session relocation response message) to the MM network element.

The PDU session relocation response message carries a second session message. Optionally, the second session message is a session management message. For example, the second session message is a session management message. Specifically, the session management message includes one or more session management messages. The one or more session management messages include modified context information corresponding to one or more communication links in a session set up between the UE and a network. Specifically, a session management request message may include updated session information, such as QoS information and service flow information.

When pending session information needs to be updated to the UE, the target SM network element sends a PDU session relocation response message to the UE.

It should be noted that, in a specific implementation process of this embodiment of the present application, operation S606 only needs to be performed after operation S604.

Operation S607: The MM network element sends a location update response message to the UE, for example, a TAU response message (TAU response message).

The TAU response message includes one or more session management messages.

Specifically, after receiving the PDU session relocation response message, the MM network element sends the TAU response message to the UE.

Operation S608: The UE sends a location update complete message to the target SM network element, for example, a TAU complete message.

The TAU complete message includes one or more session management response messages. The one or more session management response messages include a result value of session synchronization of the UE, for example, the synchronization succeeds or the synchronization fails. When the synchronization fails, a cause value of the failure is carried, for example, a communication link has been deleted.

Specifically, after receiving a TAU response message, the UE executes a session synchronization process based on a session management request in the TAU response message, and generates, after the session synchronization process is completed, a TAU complete message that includes a session management response message. The session management response message is a response message of the UE to the session management request.

Specifically, the UE sends a location update complete message to the target SM network element, and the location update complete message may be forwarded to the target SM network element by using the MM network element.

Operation S609: The target SM network element sends a PDU session update message to a UP network element.

Specifically, the target SM network element sends a PDU session update message to the UP network element, so as to instruct the UP network element to execute a synchronous update procedure of a session context. If the PDU session update message indicates that session information on the UE has been deleted, the PDU session update message instructs the UP network element to delete corresponding session information. If the PDU session update message indicates that the UE has executed a session synchronization process, the PDU session update message instructs the UP network element to execute a corresponding session synchronization process. After completing the session update procedure, the UP network element optionally performs operation S610.

Operation S610: The UP network element sends a PDU session update response message (PDU session update response message) to the target SM network element.

In a specific implementation of this embodiment of the present application, the session management method shown in FIG. 7A and FIG. 7B may further include operation S611: The target SM network element sends a pending PDU session synchronization notification message (Pending PDU session synchronized notification message) to a PF network element. After receiving the pending PDU session synchronization notification message, the PF network element sets a session to a synchronization state.

It should be noted that, the first session message and the second session message in this embodiment of the present application may be a same message. In addition, the second session message may alternatively be a message generated based on the first session message. For a specific generation method, refer to Embodiment 1. In addition, in this embodiment, for a part about the first session message and the second session message that is not described in this embodiment, refer to Embodiment 1.

As provided in this embodiment of the present application, in a scenario in which SM and MM are separated, when an SM network element connected to the UE changes, an SM network element newly connected to the UE can obtain a to-be-updated session context from the source SM network element, to execute an update procedure of a pending session. Further, if session information on the UE has been deleted, the UE instructs the SM network element to initiate a session update procedure to the UP network element.

Embodiment 6

Figure 8A:
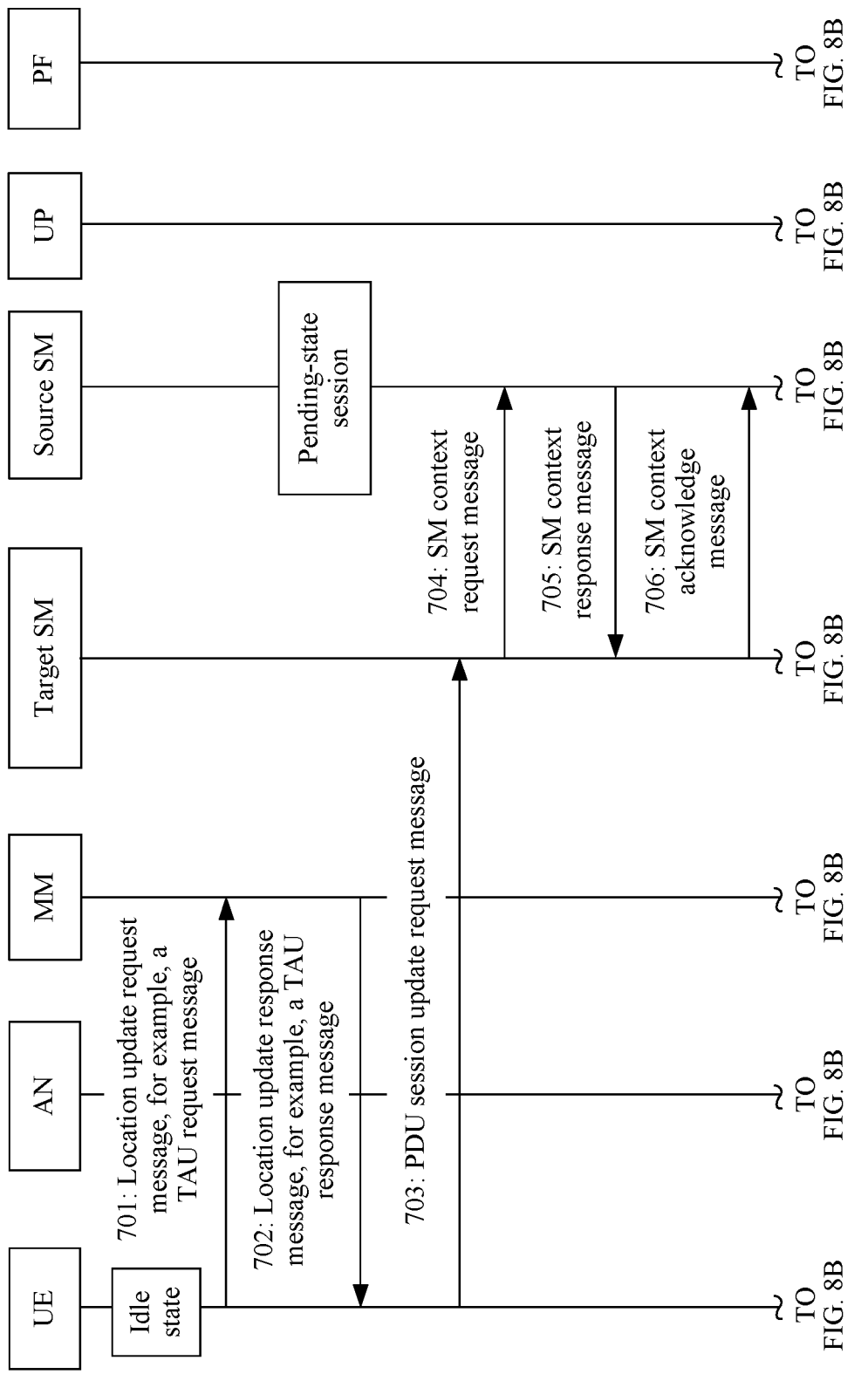

FIG. 8A and FIG. 8B are a flowchart of a session management method according to Embodiment 6 of the present application. The method shown in FIG. 8A and FIG. 8B is performed based on the scenario shown in FIG. 2. In the solution in this embodiment of the present application, an SM network element connected to the UE after a control plane connection changes is referred to as a target SM network element, and an SM network element connected to the UE before the connection changes is referred to as a source SM network element. Processing operations of the method shown in FIG. 8A and FIG. 8B are as follows.

Operation S701: The UE sends a location update request message to an MM network element.

For example, when the UE is in an idle state and needs to initiate location update, the UE sends a location update request message to the MM network element. The location update request message may be a TAU request message (TAU request message). The TAU request message carries information about the target SM network element.

Operation S702: The MM network element sends a location update response message to the UE, for example, a TAU response message (TAU response message).

Specifically, after receiving the TAU request message from the UE, the MM network element determines the target SM network element as a target session management network element, and adds information about the target SM network element to the TAU response message and then sends the TAU response message to the UE.

Operation S703: The UE sends a PDU session update request message (PDU session update request message) to the target SM network element.

The PDU session update request message carries information used to determine an address of the source SM network element.

Specifically, after receiving the TAU response message, the UE sends the PDU session update request message to the target SM network element. The PDU session update request message includes the information used to derive the address of the source SM network element. The information may be a temporary user equipment identity allocated by the source SM network element to the UE, for example, a globally unique temporary UE identity (GUTI). The source SM network element herein is a session management network element that previously manages a session context of the UE. Further, the PDU session update request message may further carry bearer status information of a communication link of a session set up between the UE and a network.

Operation S704: The target SM network element sends an SM context request message (SM Context request message) to the source SM network element.

In this operation, after the target SM network element receives a PDU session relocation request message, the target SM network element determines the address of the source SM network element based on the PDU session relocation request message. Then, the target SM network element sends the SM context request message to the source SM network element.

Operation S705: The source SM network element sends an SM context response message (SM Context response message) to the target SM network element.

The SM context response message carries a first session message. For a specific format and content of the first session message, refer to Embodiment 1. Details are not described again.

Operation S706: The target SM network element sends an SM context acknowledge message (Context Acknowledge message) to the source SM network element.

Specifically, after receiving the SM context response message, the target SM network element sends the SM context acknowledge message to the source SM network element, so as to notify the source SM network element that the target SM network element has received the SM context response message, and further, the source SM network element may delete context information of the UE or identify that context information of the UE is invalid or unavailable.

Further, after receiving the SM context response message, the target SM network element may further determine whether the first session message needs to be sent to the UE. For a determining method, refer to Embodiment 1. When the target SM network element determines that the first session message needs to be sent to the UE, the target SM network element performs all subsequent operations in this embodiment. If the target SM network element determines that the first session message does not need to be sent to the UE, the target SM network element performs operations S707 and S708.

Operation S707: The target SM network element sends a PDU session update message to a UP network element.

Specifically, the target SM network element sends a PDU session update message to the UP network element, so as to instruct the UP network element to execute a synchronous update procedure of a session context. If the PDU session update message indicates that session information on the UE has been deleted, the PDU session update message instructs the UP network element to delete corresponding session information. If the PDU session update message indicates that the UE has executed a session synchronization process, the PDU session update message instructs the UP network element to execute a corresponding session synchronization process. After completing the session update procedure, the UP network element optionally performs operation 708.

Operation S708: The UP network element sends a PDU session update response message (PDU session update response message) to the target SM network element.

Operation S709: The target SM network element sends a PDU session update response message to the UE.

The PDU session update response message carries a second session message. Optionally, the second session message is a session management message. For example, the second session message is a session management message. Specifically, the session management message may include one or more pending session management messages. The one or more session management messages include context information corresponding to a plurality of communication links in a session set up between the UE and a network. Specifically, the session management message may include updated session information, such as QoS information and service flow information.

Specifically, when pending session information needs to be updated to the UE, the target SM network element sends a PDU session update response message to the UE.

Operation S710: The UE sends a PDU session update complete message to the target SM network element.

The PDU session update complete message includes one or more session management response messages. The session management response includes a synchronization result of the UE, for example, synchronization of each session succeeds or the synchronization fails. When the synchronization fails, a cause value of the failure is carried, for example, a communication link has been deleted.

Specifically, after receiving the PDU session update response message, the UE executes a session synchronization process based on a session management request in the PDU session update response message, and generates, after the session synchronization process is completed, the PDU session update complete message that includes the session management response. The session management response is a response of the UE to the session management request.

In a specific implementation of this embodiment of the present application, the session management method shown in FIG. 8A and FIG. 8B may further include operation S711: The target SM network element sends a pending PDU session synchronization notification message (Pending PDU session synchronized notification message) to a PF network element. After receiving the pending PDU session synchronization notification message, the PF network element sets a session to a synchronization state.

It should be noted that, the first session message and the second session message in this embodiment of the present application may be a same message. In addition, the second session message may alternatively be a message generated based on the first session message. For a specific generation method, refer to Embodiment 1. In addition, in this embodiment, for a part about the first session message and the second session message that is not described in this embodiment, refer to Embodiment 1.

As provided in this embodiment of the present application, in a scenario in which SM and MM are separated, when an SM network element connected to the UE changes, an SM network element newly connected to the UE can obtain a to-be-updated session context from the source SM network element, to execute an update procedure of a pending session. Further, if session information on the UE has been deleted, the UE instructs the SM network element to initiate a session update procedure to the UP network element.

Figure 9:
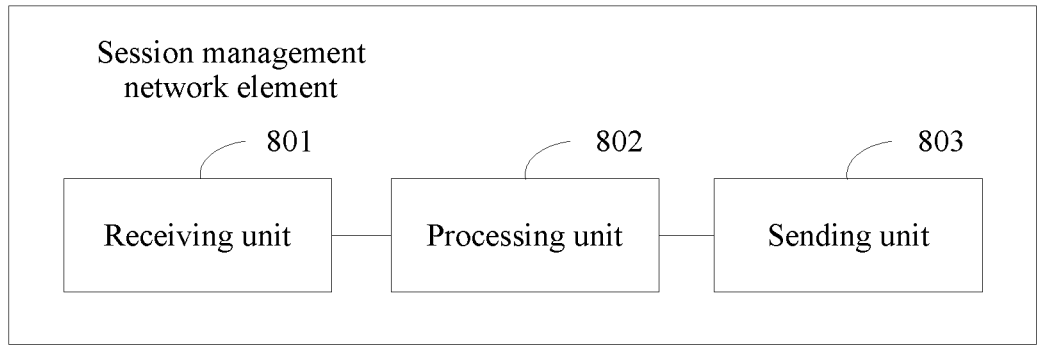
FIG. 9 is a schematic structural diagram of a session management network element according to an embodiment of the present application.

FIG. 9 is a schematic structural diagram of a session management network element according to an embodiment of the present application. As shown in FIG. 9, the session management network element may be configured to perform the session management method in each of Embodiment 1 to Embodiment 6 and FIG. 3 to FIG. 8A and FIG. 8B performed by the control plane network element connected to the UE after the control plane connection changes in the foregoing method embodiments. For example, the session management network element may be the first CP network element in Embodiment 1 to Embodiment 3. When the session management network element is a first CP network element, the session management network element may perform operations performed by the first CP network element in each of the foregoing Embodiment 1 to Embodiment 3 and FIG. 3 to FIG. 5. For another example, the session management network element may be the target SM network element in each of Embodiment 4 to Embodiment 6. When the session management network element is a target SM network element, the session management network element may perform operations performed by the target SM network element in each of Embodiment 4 to Embodiment 6 and FIG. 6A and FIG. 6B to FIG. 8A and FIG. 8B. The following describes main functions of the session management network element. For a part that is not described, refer to Embodiment 1 to Embodiment 6 and FIG. 3 to FIG. 8A and FIG. 8B.

The session management network element includes:

a receiving unit 801, configured to receive a user equipment UE context response message from a second control plane network element, where the UE context response message carries a first session message, and the first session message is a pending session message; and a sending unit 803, configured to send a second session message to user equipment according to the UE context response message.

In an embodiment, the first session message is the same as the second session message.

In an embodiment, the second session message is generated based on the first session message.

In an embodiment, the second session message is a session management message.

That a sending unit 803 sends a second session message to user equipment according to the UE context response message specifically includes performing the following operation:

sending a protocol data unit PDU session relocation response message to a mobility management MM network element according to the first session message, where the PDU session relocation response message carries the session management message, so that the MM network element sends the session management message to the user equipment.

In an embodiment, the second session message is a session management message.

That a sending unit 803 sends a second session message to user equipment according to the UE context response message specifically includes performing the following operation:

sending a location update accept message to the user equipment according to the first session message, where the location update accept message carries the session management message.

In an embodiment, the second session message is a session management message.

That a sending unit 803 sends a second session message to user equipment according to the UE context response message specifically includes performing the following operation:

sending, according to the first session message, a context setup request message to an access network element accessed by the user equipment, where the context setup request message carries the session management message, so that the access network element sends the session management message to the user equipment through radio resource control RRC reconfiguration.

In an embodiment, that a sending unit 803 sends a second session message to user equipment according to the UE context response message specifically includes performing the following operation:

sending a PDU session update response message to the user equipment according to the first session message, where the PDU session update response message carries the second session message.

In an embodiment, a processing unit 802 is configured to determine, based on communication link bearer status information of the user equipment that is obtained in advance, a communication link that is in an active state.

That a sending unit 803 sends the second session message to the user equipment specifically includes performing the following operation:

sending, to the user equipment, the second session message corresponding to the communication link in the active state.

In an embodiment, before receiving the UE context response message from the second control plane network element, the receiving unit 801 is further configured to:

receive a location update request message sent by the user equipment, where the location update request message carries information used to derive an address of the second control plane network element.

In an embodiment, before receiving the UE context response message from the second control plane network element, the receiving unit 801 is further configured to:

receive a PDU session relocation request message sent by the MM network element, where the PDU session relocation request message carries information used to derive an address of the second control plane network element.

In an embodiment, before receiving the UE context response message from the second control plane network element, the receiving unit 801 is further configured to:

receive a PDU session update request message sent by the user equipment, where the PDU session update request message carries information used to derive an address of the second control plane network element.

In an embodiment, the sending unit 803 is further configured to send a context request message to the second control plane network element.

That a receiving unit 801 receives a UE context response message from a second control plane network element specifically includes performing the following operation: receiving the UE context response message sent by the second control plane network element according to the context request message.

In an embodiment, the first control plane network element is a target SM network element, the second control plane network element is a source SM network element, and the UE context response message is an SM context response message.

In an embodiment, the sending unit 803 is further configured to send a PDU session synchronization notification message to a policy function PF network element.

The session management network element in this embodiment of the present application can implement the session management method in the foregoing method embodiment, and can manage a session in a scenario in which a control plane connection of user equipment changes.

Figure 10:
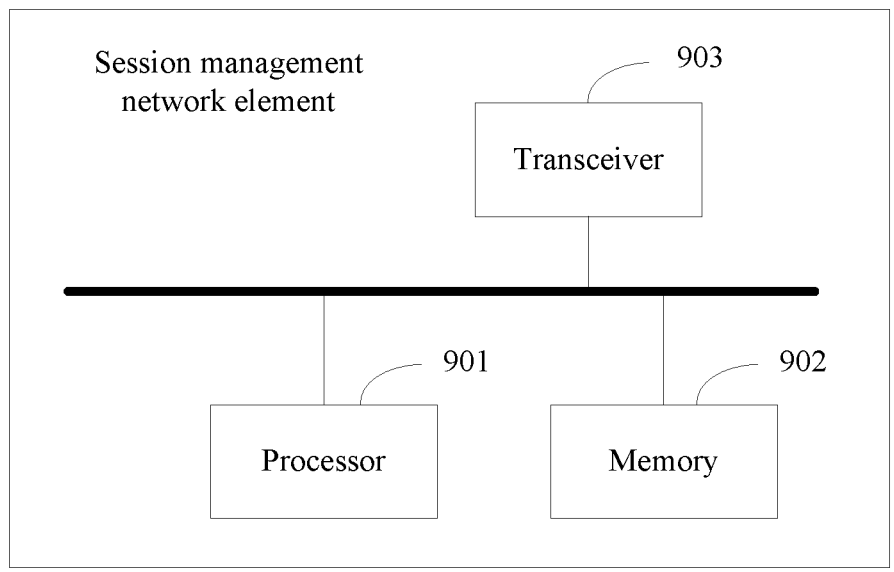
FIG. 10 is a schematic structural diagram of another session management network element according to an embodiment of the present application.

FIG. 10 is a schematic structural diagram of another session management network element according to an embodiment of the present application. The session management network element shown in FIG. 10 may be configured to perform the session management method in each of Embodiment 1 to Embodiment 6 and FIG. 3 to FIG. 8A and FIG. 8B performed by the control plane network element connected to the UE after the control plane connection changes in the foregoing method embodiments. For example, the session management network element may be the first CP network element in Embodiment 1 to Embodiment 3. When the session management network element is a first CP network element, the session management network element may perform operations performed by the first CP network element in each of the foregoing Embodiment 1 to Embodiment 3 and FIG. 3 to FIG. 5. For another example, the session management network element may be the target SM network element in each of Embodiment 4 to Embodiment 6. When the session management network element is a target SM network element, the session management network element may perform operations performed by the target SM network element in each of Embodiment 4 to Embodiment. 6 and FIG. 6A and FIG. 6B to FIG. 8A and FIG. 8B. The following describes main functions of the session management network element with reference to a specific structure of the session management network element. For a part that is not described, refer to Embodiment 1 to Embodiment 6 and FIG. 3 to FIG. 8A and FIG. 8B.

As shown in FIG. 10, the session management network element may include a processor 901, a memory 902, a transceiver 903, and the like. The processor 901, the memory 902, and the transceiver 903 may be connected by using one or more buses. The bus may be a Peripheral Component Interconnect (PCI) bus, an extended industry standard architecture (EISA) bus, or the like. The communications bus 1004 may be classified into an address bus, a data bus, a control bus, and the like. For ease of representation, only one thick line is used to represent the bus in FIG. 9, but this does not mean that there is only one bus or only one type of bus.

The transceiver 903 is configured to implement functions of the sending unit 803 and the receiving unit 801 in FIG. 9. The memory 902 is configured to store a program. Specifically, the program may include program code, and the program code includes a computer operation instruction. The memory 902 may include a random access memory (RAM), and may further include a non-volatile memory, for example, at least one magnetic disk storage. The processor 901 is configured to execute the program stored in the memory 902, and details are as follows.

The transceiver 903 receives a user equipment (UE) context response message from a second control plane network element under control of the processor 901, where the UE context response message carries a first session message, and the first session message is a pending session message. The transceiver 903 sends a second session message to user equipment according to the UE context response message under control of the processor 901.

In an embodiment, the first session message is the same as the second session message.

In an embodiment, the second session message is generated based on the first session message.

In an embodiment, the second session message is a session management message.

That the transceiver 903 sends a second session message to user equipment according to the UE context response message under control of the processor 901 specifically includes performing the following operation:

sending a protocol data unit PDU session relocation response message to a mobility management (MM) network element according to the first session message, where the PDU session relocation response message carries the session management message, so that the MM network element sends the session management message to the user equipment.

In an embodiment, the second session message is a session management message.

That the transceiver 903 sends a second session message to user equipment according to the UE context response message under control of the processor 901 specifically includes performing the following operation:

sending a location update accept message to the user equipment according to the first session message, where the location update accept message carries the session management message.

In an embodiment, the second session message is a session management message.

That the transceiver 903 sends a second session message to user equipment according to the UE context response message under control of the processor 901 specifically includes performing the following operation:

sending, according to the first session message, a context setup request message to an access network element accessed by the user equipment, where the context setup request message carries the session management message, so that the access network element sends the session management message to the user equipment through radio resource control (RRC) reconfiguration.

In an embodiment, that the transceiver 903 sends a second session message to user equipment according to the UE context response message under control of the processor 901 specifically includes performing the following operation:

sending a PDU session update response message to the user equipment according to the first session message, where the PDU session update response message carries the second session message.

In an embodiment, the processor 901 is further configured to determine, based on communication link bearer status information of the user equipment that is obtained in advance, a communication link that is in an active state.

That the transceiver 903 sends the second session message to the user equipment under control of the processor 901 specifically includes performing the following operation:

sending, to the user equipment, the second session message corresponding to the communication link in the active state.

In an embodiment, before receiving the UE context response message from the second control plane network element under control of the processor 901, the transceiver 903 is further configured to:

receive a location update request message sent by the user equipment, where the location update request message carries information used to derive an address of the second control plane network element.

In an embodiment, before receiving the UE context response message from the second control plane network element under control of the processor 901, the transceiver 903 is further configured to:

receive a PDU session relocation request message sent by the MM network element, where the PDU session relocation request message carries information used to derive an address of the second control plane network element.

In an embodiment, before receiving the UE context response message from the second control plane network element under control of the processor 901, the transceiver 903 is further configured to:

receive a PDU session update request message sent by the user equipment, where the PDU session update request message carries information used to derive an address of the second control plane network element.

In an embodiment, the transceiver 903 is further configured to send a context request message to the second control plane network element under control of the processor 901.

That the transceiver 903 receives a UE context response message from a second control plane network element under control of the processor 901 specifically includes performing the following operation: receiving the UE context response message sent by the second control plane network element according to the context request message.

In an embodiment, the first control plane network element is a target SM network element, the second control plane network element is a source SM network element, and the UE context response message is an SM context response message.

In an embodiment, the transceiver 903 is further configured to send a PDU session synchronization notification message to a policy function PF network element under control of the processor 901.

The session management network element in this embodiment of the present application can implement the session management method in the foregoing method embodiment, and can manage a session in a scenario in which a control plane connection of user equipment changes.

The foregoing processor 901 may include an integrated circuit (IC), for example, may include a single packaged IC, or may include a plurality of packaged ICs having a same function or different functions. For example, the processor 901 may include only a central processing unit (CPU), or may be a combination of a graphics processing unit (GPU), a digital signal processor (DSP), and a control chip (such as a baseband chip) in the transceiver 903. In an implementation of the present application, the CPU may be a single operation core, or may include a plurality of operation cores.

The transceiver 903 is configured to establish a communication channel, so that the session management network element is connected to a receive device through the communication channel, so as to implement data transmission between session management network elements. The transceiver 903 may include a communications module such as a wireless local area network (WLAN) module, a Bluetooth module, or a baseband module, and a radio frequency (RF) circuit corresponding to the communications module, and is configured to perform wireless local area network communication, Bluetooth communication, infrared communication, and/or cellular communications system communication, such as Wideband Code Division Multiple Access (WCDMA) and/or High Speed Downlink Packet Access (HSDPA). The transceiver 903 is configured to control communication between all the components in the session management network element, and may support direct memory access.

In different implementations of the present application, various transceivers in the transceiver 903 generally appear in a form of an integrated circuit chip, and may be selectively combined without a need of including all transceivers and a corresponding antenna group. For example, the transceiver 903 may include only a baseband chip, a radio frequency chip, and a corresponding antenna, so as to provide a communication function in a cellular communications system. For example, the session management network element can connect to a cellular network or the Internet by using a wireless communication connection established by the transceiver, for example, by using wireless local area network access or WCDMA. In some optional implementations of the present application, the communications module such as a baseband module in the transceiver may be integrated into the processor, typically, such as an Application Processor Qualcomm®+Mobile Data Modem (APQ+MDM) family of platforms provided by, e.g., Qualcomm®. The radio frequency circuit is configured to: receive and send a signal in an information receiving/transmitting process or a call process. For example, after receiving downlink information from a network device, the radio frequency circuit sends the downlink information to the processor for processing; and in addition, sends related uplink data to the network device. Usually, the radio frequency circuit includes a public circuit configured to execute these functions; and includes but is not limited to an antenna system, a radio frequency transceiver, one or more amplifiers, a tuner, one or more oscillators, a digital signal processor, a codec (codec) chip set, a subscriber identity module (SIM) card, a memory, and the like. In addition, the radio frequency circuit may further communicate with a network and another device through wireless communication. The wireless communication may use any communications standard or protocol, including but not limited to the Global System for Mobile Communications (GSM), a general packet radio service (GPRS), Code Division Multiple Access (CDMA), Wideband Code Division Multiple Access (WCDMA), a High Speed Uplink Packet Access (HSUPA) technology, Long Term Evolution (LTE), and the like.

In specific implementation, the present application further provides a computer storage medium, where the computer storage medium may store a program, and when the program is executed, some or all of the operations of the embodiments of the session management method provided in the present application may be performed. The foregoing storage medium may be a magnetic disk, an optical disc, a read-only memory (ROM), or a random access memory (RAM).

A person skilled in the art may clearly understand that, the technologies in the embodiments of the present application may be implemented by software in addition to a necessary general hardware platform. Based on such an understanding, the technical solutions in the embodiments of the present application essentially or the part contributing to the prior art may be implemented in a form of a software product. The computer software product may be stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of the present application.

For same or similar parts in the embodiments in this specification, mutual reference may be made between these embodiments. Especially, a session management network element embodiment is basically similar to a method embodiment, and therefore is described briefly. For related parts, refer to descriptions in the method embodiment. The foregoing descriptions are implementations of the present application, but are not intended to limit the protection scope of the present application.

What is claimed is:
1. A session management method, comprising:
receiving, by a first control plane network element, a user equipment (UE) context response message from a second control plane network element, wherein the UE context response message carries a first session message, and the first session message is a pending session message corresponding to a pending session management request that previously needs to be synchronized to the UE, the pending session management request includes modified context information corresponding to a communication link between the UE and a network; and
sending, by the first control plane network element, a second session message to user equipment according to the UE context response message including:
determining, by the first control plane network element based on communication link bearer status information of the user equipment that is obtained in advance, a communication link that is in an active state; and sending, by the first control plane network element to the user equipment, the second session message corresponding to the communication link in the active state, wherein the first session message is the same as the second session message, wherein the first control plane network element is a control plane network element to which the user equipment is newly connected, and the second control plane network element is a source control plane network element of the user equipment.

2. The method according to claim 1, wherein the second session message is generated based on the first session message.

3. The method according to claim 1, wherein the second session message is a session management message; and the sending, by the first control plane network element, the second session message to user equipment according to the UE context response message comprises:

sending, by the first control plane network element, a protocol data unit (PDU) session relocation response message to a mobility management (MM) network element according to the first session message, wherein the PDU session relocation response message carries the session management message, so that the MM network element sends the session management message to the user equipment.

4. The method according to claim 1, wherein the second session message is a session management message; and the sending, by the first control plane network element, the second session message to user equipment according to the UE context response message comprises:

sending, by the first control plane network element, a location update accept message to the user equipment according to the first session message, wherein the location update accept message carries the session management message.

5. The method according to claim 1, wherein the second session message is a session management message; and the sending, by the first control plane network element, the second session message to user equipment according to the UE context response message comprises:

sending, by the first control plane network element according to the first session message, a context setup request message to an access network element accessed by the user equipment, wherein the context setup request message carries the session management message.

6. The method according to claim 1, wherein the second session message is a session management message; and the sending, by the first control plane network element, the second session message to user equipment according to the UE context response message comprises:

sending, by the first control plane network element, a PDU session update response message to the user equipment according to the first session message, wherein the PDU session update response message carries the session management message.

7. The method according to claim 1, wherein before the receiving, by a first control plane network element, a UE context response message from a second control plane network element, the method further comprises:

receiving, by the first control plane network element, a location update request message from the user equipment, wherein the location update request message carries information used to derive an address of the second control plane network element.

8. The method according to claim 1, wherein before the receiving, by the first control plane network element, the UE context response message from the second control plane network element, the method further comprises:

receiving, by the first control plane network element, a PDU session relocation request message from the MINI network element, wherein the PDU session relocation request message carries information used to derive an address of the second control plane network element.

9. The method according to claim 1, wherein before the receiving, by the first control plane network element, the UE context response message from the second control plane network element, the method further comprises:

receiving, by the first control plane network element, a PDU session update request message from the user equipment, wherein the PDU session update request message carries information used to derive an address of the second control plane network element.

10. The method according to claim 1, wherein the receiving, by the first control plane network element, the UE context response message from the second control plane network element comprises:

sending, by the first control plane network element, a UE context request message to the second control plane network element; and receiving, by the first control plane network element, the UE context response message from the second control plane network element according to the UE context request message.

11. The method according to claim 1, wherein the first control plane network element is a target session management (SM) network element, the second control plane network element is a source SM network element, and the UE context response message is an SM context response message.

12. A session management network element, wherein the network element is deployed in a first control plane network element and comprises: a processor and a memory, wherein the memory is configured to store a program, and the processor runs the program in the memory to:

receive a user equipment (UE) context response message from a second control plane network element, wherein the UE context response message carries a first session message, and the first session message is a pending session message corresponding to a pending session management request that previously needs to be synchronized to the UE, the pending session management request includes modified context information corresponding to a communication link between the UE and a network; and send a second session message to user equipment according to the UE context response message, including:

determining, by the first control plane network element based on communication link bearer status information of the user equipment that is obtained in advance, a communication link that is in an active state; and sending, by the first control plane network element to the user equipment, the second session message corresponding to the communication link in the active state, wherein the first session message is the same as the second session message, wherein the first control plane network element is a control plane network element to which the user equipment is newly connected, and the second control plane network element is a source control plane network element of the user equipment.

13. The network element according to claim 12, wherein the second session message is generated based on the first session message.

14. The network element according to claim 12, wherein the second session message is a session management message; and the processor is further configured to send a protocol data unit (PDU) session relocation response message to a mobility management (MM) network element according to the first session message, wherein the PDU session relocation response message carries the session management message.

15. The network element according to claim 12, wherein the second session message is a session management message; and the processor is further configured to send a location update accept message to the user equipment according to the first session message, wherein the location update accept message carries the session management message.

16. The network element according to claim 12, wherein the second session message is a session management message; and the processor is further configured to send, according to the first session message, a context setup request message to an access network element accessed by the user equipment, wherein the context setup request message carries the session management message.

17. The network element according to claim 12, wherein the second session message is a session management message; and the processor is further configured to send a protocol data unit (PDU) session update response message to the user equipment according to the first session message, wherein the PDU session update response message carries the session management message.

18. A communication system, comprising: a first control plane network element and a second control plane network element, wherein the first control plane network element is configured to receive a user equipment (UE) context response message from the second control plane network element, wherein the UE context response message carries a first session message, and the first session message is a pending session message corresponding to a pending session management request that previously needs to be synchronized to the UE, the pending session management request includes modified context information corresponding to a communication link between the UE and a network; and send a second session message to user equipment according to the UE context response message, including:

determining based on communication link bearer status information of the user equipment that is obtained in advance, a communication link that is in an active state; and sending the second session message corresponding to the communication link in the active state, wherein the first session message is the same as the second session message; and the second control plane network element is configured to send the UE context response message, wherein the first control plane network element is a control plane network element to which the user equipment is newly connected, and the second control plane network element is a source control plane network element of the user equipment.

19. The communication system according to claim 18, further comprises: the user equipment, configured to receive the second session message from the first control plane network element.

* * * * *

UNITED STATES PATENT AND TRADEMARK OFFICE
CERTIFICATE OF CORRECTION

| | |
|---|---|
| PATENT NO. | : 11,483,898 B2 |
| APPLICATION NO. | : 16/380444 |
| DATED | : October 25, 2022 |
| INVENTOR(S) | : Yizhuang Wu and Chunshan Xiong |

It is certified that error appears in the above-identified patent and that said Letters Patent is hereby corrected as shown below:

In the Claims

In Claim 8, Column 30, Line 6, delete "MINI" and insert --MM--.

Signed and Sealed this
Thirty-first Day of January, 2023

Katherine Kelly Vidal
*Director of the United States Patent and Trademark Office*